(12) United States Patent
El-Katcha et al.

(10) Patent No.: US 6,606,798 B2
(45) Date of Patent: Aug. 19, 2003

(54) LASER LEVEL

(75) Inventors: Karim El-Katcha, San Carlos, CA (US); William R. Reeve, Santa Clara, CA (US); Robert E. McCracken, Aiken, SC (US); Allen Brelsford, Baldwin, MD (US); Donald W. Zurwelle, Lutherville, MD (US); Fred S. Watts, New Freedom, PA (US)

(73) Assignee: Black & Decker Inc., Newark, DE (US)

( * ) Notice: Subject to any disclaimer, the term of this patent is extended or adjusted under 35 U.S.C. 154(b) by 7 days.

(21) Appl. No.: 10/061,714

(22) Filed: Feb. 1, 2002

(65) Prior Publication Data

US 2002/0162233 A1 Nov. 7, 2002

Related U.S. Application Data

(60) Provisional application No. 60/270,969, filed on Feb. 23, 2001, now abandoned.

(51) Int. Cl.$^7$ .......................... G01C 5/00; G01C 15/00; G01B 11/26
(52) U.S. Cl. ................. 33/290; 33/227; 33/DIG. 21
(58) Field of Search ..................... 33/227, 276, 281, 33/282, 285, 286, 290, 291, DIG. 21

(56) References Cited

U.S. PATENT DOCUMENTS

| | | | | |
|---|---|---|---|---|
| 4,973,158 A | * | 11/1990 | Marsh | 33/291 |
| 4,988,192 A | * | 1/1991 | Knittel | 33/281 |
| 5,485,266 A | * | 1/1996 | Hirano et al. | 33/281 |
| 5,572,796 A | * | 11/1996 | Breda | 33/285 |
| 5,636,018 A | * | 6/1997 | Hirano et al. | 33/291 |
| 6,073,353 A | * | 6/2000 | Ohtomo et al. | 33/290 |
| 6,209,832 B1 | | 4/2001 | Yamazaki | |
| 6,249,983 B1 | * | 6/2001 | Wright et al. | 33/286 |
| 6,256,895 B1 | * | 7/2001 | Akers | 33/286 |
| 6,449,856 B1 | * | 9/2002 | Matsumoto et al. | 33/DIG. 21 |
| 6,532,676 B2 | * | 3/2003 | Cunningham | 33/286 |
| 6,539,638 B1 | * | 4/2003 | Pelletier | 33/290 |

FOREIGN PATENT DOCUMENTS

JP  11-287654  10/1999

OTHER PUBLICATIONS

F. Hoekstra, Partial European Search Report, May 29, 2002, The Hague.

* cited by examiner

*Primary Examiner*—G. Bradley Bennett
(74) *Attorney, Agent, or Firm*—Adan Ayala

(57) ABSTRACT

A light detector which includes a housing having front and rear walls, a light receiving section disposed on the front wall, and displays disposed on the front and rear walls for showing the location of received light relative on the light receiving section. Also disclosed is a laser level including a motor, a shaft driven by the motor, a housing fixedly disposed on the shaft, the housing having a bore therein, a barrel pivotally connected to the housing, a laser diode module disposed within the barrel, and a screw disposed on the housing and contacting the barrel for adjusting the pivotal position of the barrel.

17 Claims, 16 Drawing Sheets

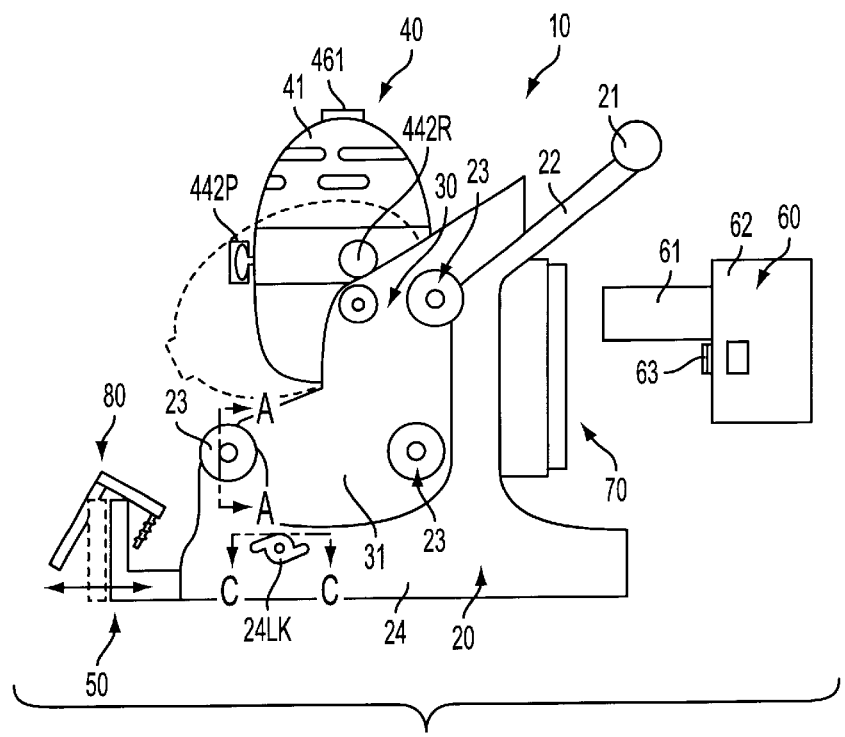
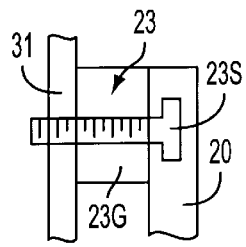
FIG. 2A
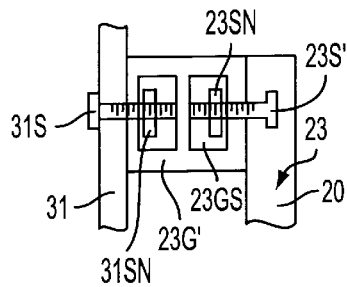
FIG. 2B
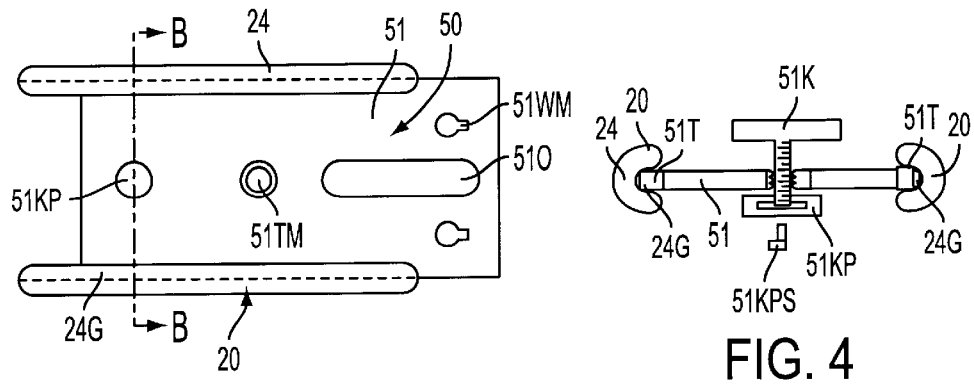
FIG. 3
FIG. 4

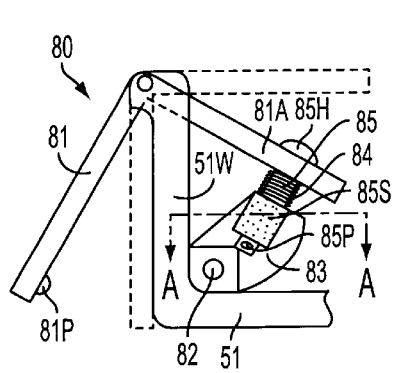
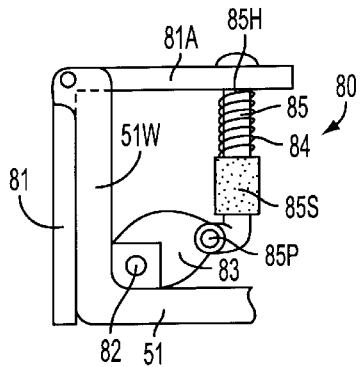
FIG. 7A   FIG. 7B
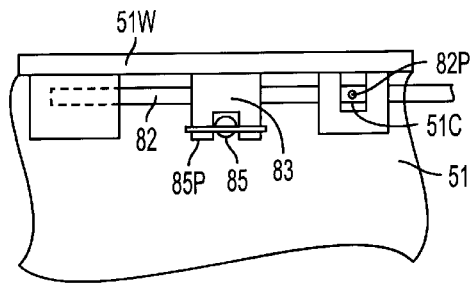
FIG. 7C
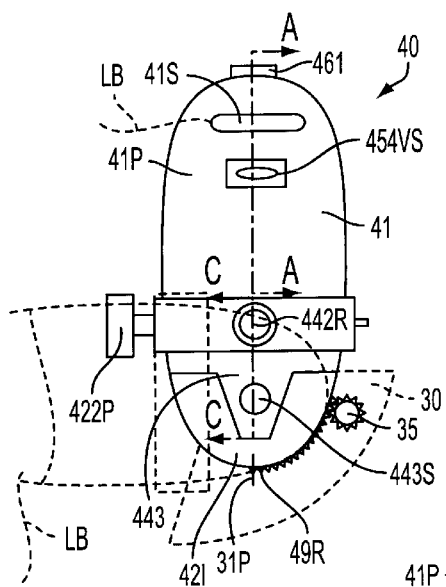
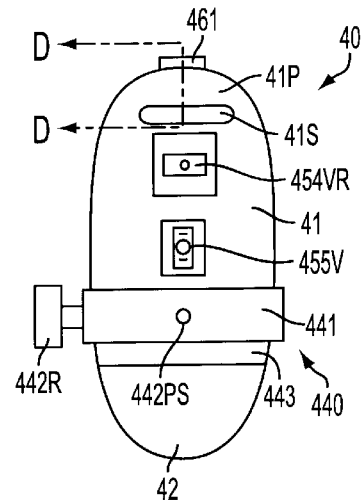
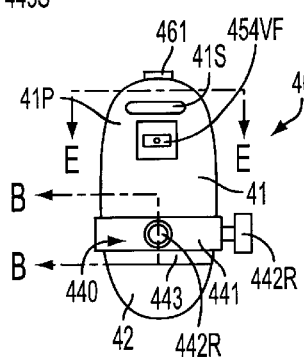
FIG. 8A   FIG. 8B   FIG. 8C

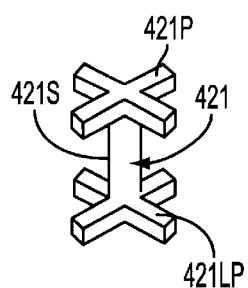
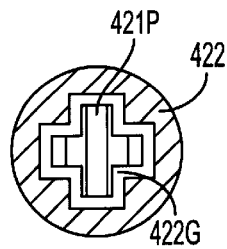
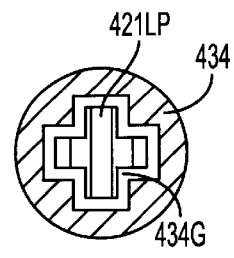
FIG. 16　　　FIG. 17　　　FIG. 18
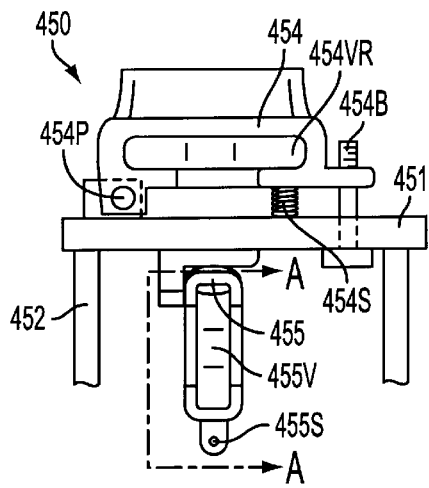
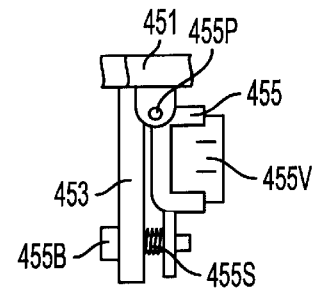
FIG. 23A　　　FIG. 23B
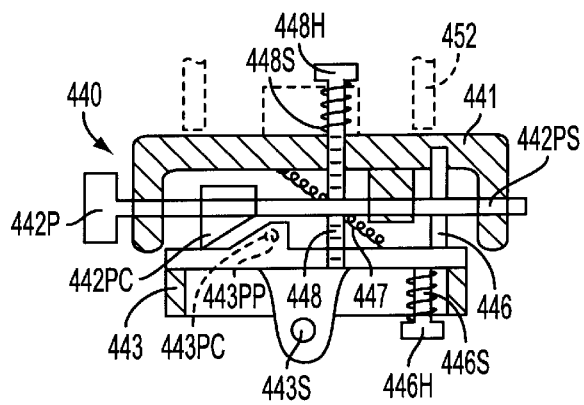
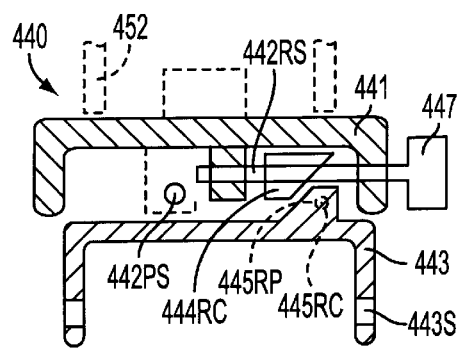
FIG. 24　　　FIG. 25

LASER LEVEL

CROSS-REFERENCE TO RELATED APPLICATIONS

This application derives priority under 35 USC §119(e) from U.S. Application Serial No. 60/270,969, filed Feb. 23, 2001, now abandoned.

BACKGROUND OF INVENTION

Laser levels have been used in construction for many years. They typically seek to produce a plane of light for a reference for construction projects. Laser levels have been used for large scale construction projects like commercial excavating, laying foundations, and installing drop ceilings. Laser levels save considerable time during initial layout of a construction job compared to other tools such as beam levels, chalk lines, or torpedo levels. Some examples of jobs where laser levels would be useful include laying tile, mounting cabinets, installing counter tops, and building outdoor decks. Because these laser levels can typically cost thousands of dollars, only those who regularly land larger construction projects can justify purchasing a laser level. Laser levels have not achieved widespread adoption by the general public despite the time savings because of their initial cost of ownership. The expense can be attributed to the cost of suitable laser sources such as He-Neon laser and associated optical system used to manipulate the beam generated by the laser source.

SUMMARY OF INVENTION

In accordance with the present invention, an improved laser level is employed. The laser level comprises a motor, a shaft driven by the motor, a housing fixedly disposed on the shaft, the housing having a bore therein, a barrel pivotally connected to the housing, a laser diode module disposed within the barrel, and a screw disposed on the housing and contacting the barrel for adjusting the pivotal position of the barrel.

Also disclosed is a light detector, which comprises a housing having front and rear walls, a light receiving section disposed on the front wall, and displays disposed on the front and rear walls for showing the location of received light relative on the light receiving section.

Additional features and benefits of the present invention are described, and will be apparent from, the accompanying drawings and the detailed description below.

BRIEF DESCRIPTION OF DRAWINGS

The accompanying drawings illustrate preferred embodiments of the invention according to the practical application of the principles thereof, and in which:

FIG. 1 is a side view of a laser level according to the invention;

FIG. 2 is a partial cross-sectional view along line A—A of FIG. 1, where FIGS. 2A–2B show two different embodiments;

FIG. 3 is a bottom plan view of the laser level;

FIG. 4 is a cross-sectional view along line B—B of FIG. 3;

FIG. 7 illustrates a clamp assembly, where FIGS. 7A–B show the clamp assembly in the open and closed positions, respectively, and FIG. 7C is a partial top plan view along line A—A of FIG. 7A;

FIG. 8 illustrates the engine assembly, where FIGS. 8A–D are right side, rear, front and left side views, respectively;

FIG. 13 illustrates a battery ejector assembly, where

FIG. 16 is a perspective view of a link of the laser assembly of FIG. 15;

FIG. 17 is a cross-sectional view along line A—A of FIG. 15;

FIG. 18 is a cross-sectional view along line B—B of FIG. 15;

FIG. 23 illustrates a vial plate of the laser assembly, where FIG. 23A is a front view and FIG. 23B is a side view along line A—A of FIG. 23A;

FIG. 24 is a cross-sectional view along line C—C of FIG. 8A;

FIG. 25 is a cross-sectional view along line B—B of FIG. 8C;

FIG. 27 illustrates the bump sensor assembly, where

FIG. 29 is a circuit schematic of the bump sensor circuit of FIG. 28, of which

FIG. 35 illustrates the motor speed control circuit, where FIG. 36 illustrates a light detector according to the invention, where

DETAILED DESCRIPTION

Figure 5:
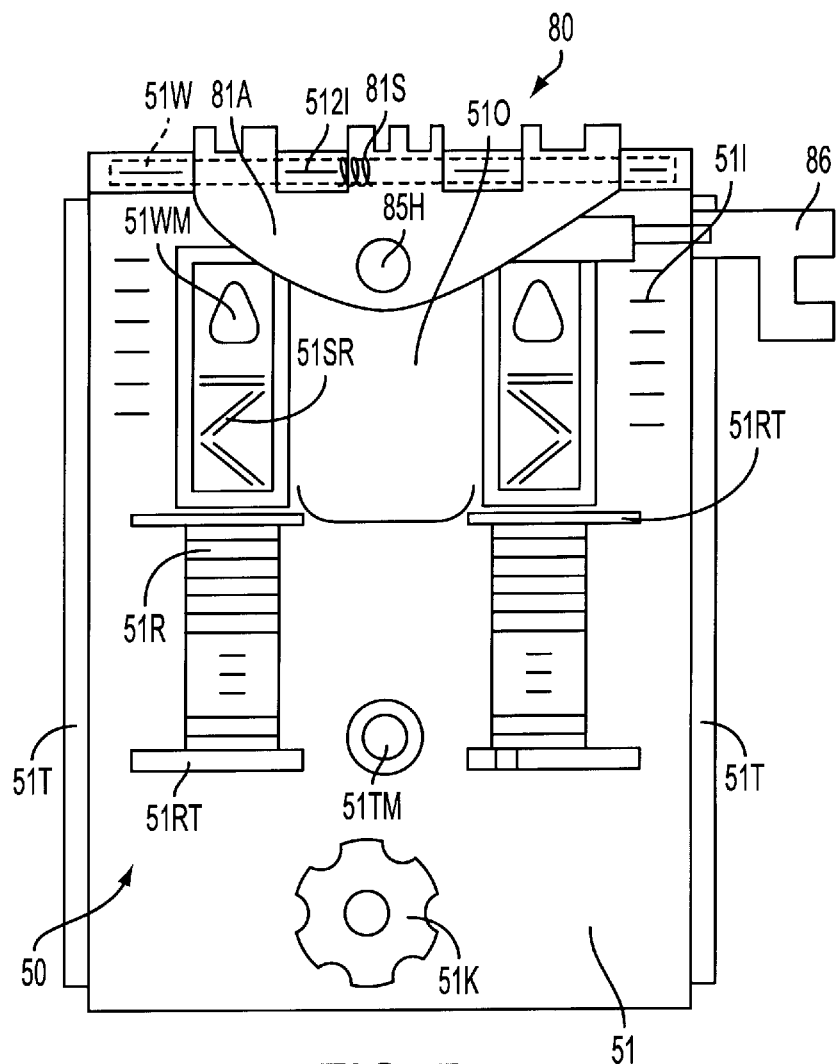
FIG. 5 is a top plan view of the show assembly.
Figure 6:
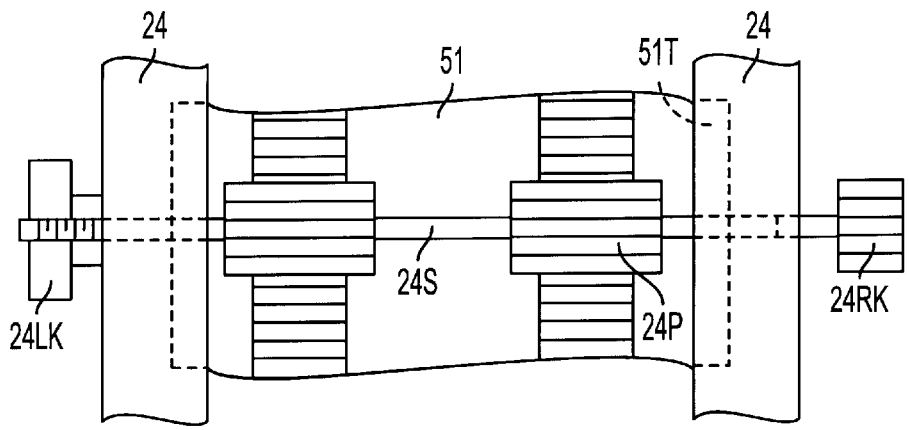
FIG. 6 is a partial top plan view along line C—C of FIG. 1.

The invention is now described with reference to the accompanying figures, wherein like numerals designate like parts. Referring to FIG. 1, a laser level 10 preferably comprises a frame assembly 30, an engine assembly 40 rotatably attached to frame assembly 30, a laser diode assembly 410 (shown in FIG. 20) disposed within engine assembly 40, a protective assembly 20 connected to frame assembly 30, a shoe assembly 50 slidably attached to protective assembly 20, a clamp assembly 80 disposed on shoe assembly 50, and a multi-battery adapter assembly 70 for receiving a battery 60. These assemblies are discussed in further detail below.

Preferably, protective assembly 20 has at least one protective bar 22 flexibly connected to the frame assembly 30. Such bar 22 may be made of aluminum, or other suitable material. Preferably, the bar 22 is made of a plastic, such as ABS or polypropylene. The bar 22 may be injection-molded. Alternatively, the plastic may be injected into a mold (preferably about half the volume needed to complete fill the mold and thus filling half of the mold), then air or gas is blown therein, pushing the plastic into the other half of the mold, forming a hollow tube. This process is known as gas-assist injection molding.

The entire protective assembly 20 may be constructed as discussed above. Preferably, the protective assembly 20 surrounds and/or is disposed on both sides of frame assembly 30. A handle 21 may be disposed between bars 22. Handle 21 may be fixedly attached to the bars 22 via, e.g., screws (not shown).

Preferably, the shape of protective assembly 20 and handle 21 is such that the frame assembly 30 and/or engine assembly 40 cannot be contacted by anything wider than the handle 21 and/or protective assembly 20. Such construction minimizes the risk of damage to frame assembly 30 and/or engine assembly 40.

As mentioned above, the protective assembly 20 may be flexibly connected to the frame assembly 30. Such connection is achieved via the connector assemblies 23. Referring to FIG. 2A, a connector assembly 23 is disposed between the protective assembly 20 and a wall 31 of frame housing 30. The connector assembly 23 comprises a flexible isolator 23G, which is preferably made of a flexible, resilient material such as rubber or an elastometer. The isolator 23G may be connected to the protective assembly 20 and wall 31 via a screw 23S, which may extend through one of the protective assembly 20 and/or wall 31 and threadingly engage the other of the protective assembly 20 and/or wall 31.

Alternatively, a isolator 23G' may be connected to protective assembly 20 via a screw 23S' extending through the protective assembly 20 and entering into isolator 23G', or vice versa, as shown in FIG. 2B. Screw 23S' may then threadedly engage a nut 23SN. The isolator 23G' in turn may be connected to the wall 31 via a screw 31 S extending through the wall 31 and entering into isolator 23G', or vice versa. Screw 31 S may then threadedly engage a nut 31SN. Isolator 23G' may be molded over screws 23S', 31S and/or nuts 23SN, 31SN. Such construction minimizes the shock received by frame assembly 30 and/or engine assembly 40, and thus by the circuitry and components mounted within, when laser level 10 is dropped.

Referring to FIGS. 1 and 3–6, shoe assembly 50 may be slidably connected to protective assembly 20. Protective assembly 20 may have two rails 24 surrounding shoe assembly 50. Shoe assembly 50 may have a plate 51, with tabs 51T extending therefrom. Plate 51 is preferably made of plastic. Preferably, each rail 24 has a groove 24G for receiving tab 51T. Accordingly, shoe assembly 50 can slide relative to protective assembly 20 via the groove/tab connection. Persons skilled in the art should recognize that the same result would be achieved if protective assembly 20 and shoe assembly 50 had tabs and channels disposed respectively thereon.

Shoe assembly 50 may have at least one rack 51R (and preferably two racks 51R) disposed on plate 51. Such rack 51R engages pinion 24P disposed on a shaft 24S, which may extend between rails 24.

Shaft 24S preferably carries rotatable knob 24RK at one end of the shaft. Rotatable knob 24RK is fixedly connected to shaft 24S. Accordingly, a user can rotate the pinions 24P by rotating rotatable knob 24RK. As the pinions 24P rotate, the plate 51 will move forwardly or rearwardly. Travel of plate 51 may be limited by disposing enlarged teeth 51RT at the beginning and/or the end of rack 51R Because pinion 24P will not be able to mesh with enlarged teeth 51RT, pinion 24P will not rotate any further and travel of plate 51 in that direction is limited.

Shaft 24S may also carry locking knob 24LK at its other end of the shaft. Locking knob 24LK may threadingly engage shaft 24S. Accordingly, when a user rotates locking knob 24LK, the knob will pinch rails 24 between locking knob 24LK and rotatable knob 24RK, locking plate 51 in place. Therefore, the user can fix and lock the shoe assembly 50 relative to protective assembly 20 by rotating locking knob 24LK.

Plate 51 may also have strengthening ribs 51SR for strengthening the plate 51. Plate 51 may also have an opening 51O for reducing the weight of and/or the amount of materials used in plate 51. Opening 51O may also allow viewing of the cast laser beam on a floor or work surface. Plate 51 may also have a threaded tripod mount 51TM.

Plate 51 may also have wall mount holes 51WM for receiving at least one nail or screw mounted on a wall, allowing the user to hang the laser level 10 from a wall. The verticality of laser level 10 can then be adjusted by rotating knob 51K. Knob 51K preferably extends through and threadingly engages plate 51. A pad 51KP may be disposed at the end of knob 51K. Pad 51KP may be made of plastic or rubber. Pad 51KP may be fixed or captured on knob 51K via a screw 51KPS and/or washer (not shown), or may snap into a feature of rotating knob 51K. Accordingly, the distance between plate 51 and the wall may be adjusted by rotating knob 51K. Because pad 51KP may be free to swivel about knob 51K, it can be used on uneven or unlevel surfaces.

Referring to FIGS. 1, 5 and 7, plate 51 may also support clamp assembly 80. Clamp assembly 80 may be used for clamping laser level 10 onto a ceiling, etc. Preferably, plate 51 has a vertical wall 51W, which is pivotally connected to clamping wall 81. Clamping wall 81 may have protrusions 81P for enhancing the clamping of a surface. Similarly, wall 51W may have protrusions (not shown) for enhancing the clamping of a surface. Persons skilled in the art will recognize that a surface will be clamped between wall 51W and clamping wall 81.

Preferably, clamp assembly 80 can be opened and closed. This can be accomplished in different manners. One such manner provides clamping wall 81 with an extension arm 81A, which may be substantially perpendicular to wall 81. A shaft 85 may extend through arm 81A and is pivotally connected to a cam 83 via a pin 85P. Persons skilled in the art will recognize that arm 81A may be contacted underneath by the head 85H of shaft 85 and/or spring 84, which may be captured between arm 81A and shoulder 85S of shaft 85. Because of this, arm 81A (and thus wall 81) will move when shaft 85 moves upwardly.

Cam 83 may fixedly attached to shaft 82, which may be rotated by lever 86. Accordingly, when shaft 82 is rotated in one direction, cam 83 is rotated is rotated in the same direction, moving shaft 85 upwardly, which in turn moves arm 81A upwardly, rotating clamping wall 81 towards wall 51W. In other words, clamp assembly 80 is thus closed. If shaft 85 bottoms out, spring 84 can move arm 81A further.

Preferably, a torsion spring 81S may be disposed between clamping wall 81 (or arm 81A) and wall 51W. When cam 83 is rotated in the other direction, the force pressed onto arm 81A by shaft 85 and/or spring 84 is diminished. Torsion spring 81S then forces the wall 81 (or arm 81A) away from wall 51W. In other words, clamp assembly 80 is thus opened. Therefore, clamp assembly 80 may be opened or closed by rotation of shaft 82.

It is preferable to provide shaft 82 with a pin 82P traveling along a channel 51C in plate 51 to limit the range of rotation of shaft 82. This prevents a user from overtightening clamp assembly 80.

Preferably, wall 51W has zero markings 51ZI. Plate 51 may also have indicia 51I to indicate the distance between the clamping wall 81 and/or wall 51W (or zero marking 51ZI) and the frame assembly 30. Accordingly, the user can precisely determine whether the frame assembly 30 and/or engine assembly 40 is at, e.g., two inches from the clamping wall 81 and/or wall 51W.

Figure 8D:
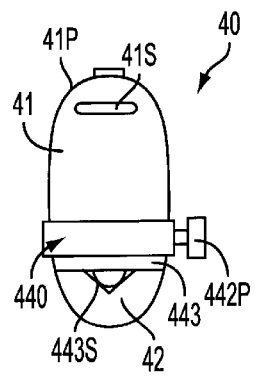

As mentioned above, engine assembly 40 is pivotally attached to frame assembly 30, as shown in FIGS. 1 and 8. In other words, engine assembly 40 may be rotated from a substantially vertical position for radiating a laser beam LB along a horizontal plane to a substantially horizontal position (shown in dotted lines) for radiating laser beam LB along a vertical plane. Persons skilled in the art will recognize that, if the vertical position is 0° and the horizontal position is 90°, it is preferable to allow rotation of engine assembly 40 from about −5° to 140°.

Referring to FIGS. 1 and 8–10, a shaft 32 extends through frame assembly 30 and engine assembly 40, allowing engine assembly 40 to rotate thereabout. Engine assembly 40 may have a rack 49R which meshes with a pinion 35 supported by frame assembly 30. Accordingly, the user can precisely rotate engine assembly 40 by rotating pinion 35. It is preferable to provide a pointer 31P and indicia 42I on wall 31 and engine assembly 40 to indicate the angle of engine assembly 40 relative to frame assembly 30.

Figure 9:
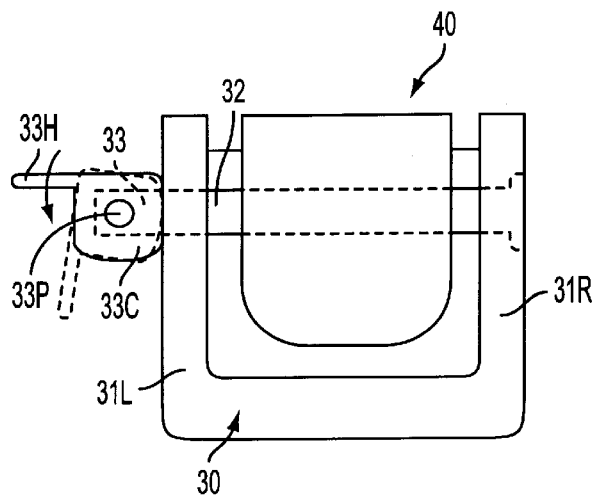
FIG. 9 is a first engine assembly locking mechanism.

FIG. 9 illustrates a first locking mechanism for fixing the angular position of engine assembly 40. As mentioned above, shaft 32 extends through right wall 31R, engine assembly 40 and left wall 31L. A cam 33 may be pivotally attached to shaft 32 via pin 33P. When a user rotates cam 33 via handle 33H, camming portion 33C increases the distance between pin 33P and left wall 31L. Such action locks engine assembly 40 by pinching engine assembly 40 between walls 31R, 31L. Alternatively, if engine assembly 40 is fixedly connected, no pinching is necessary, as the camming portion 33C will prevent rotation of shaft 32 until released.

Figure 10:
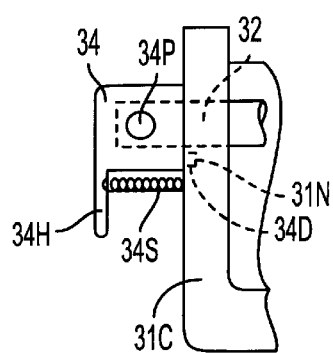
FIG. 10 is a second engine assembly locking mechanism.
Figure 11:
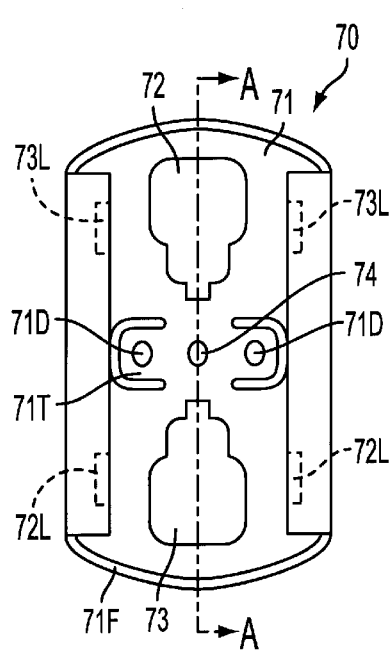
FIG. 11 is a rear view of a multi-battery adapter assembly.
Figure 12:
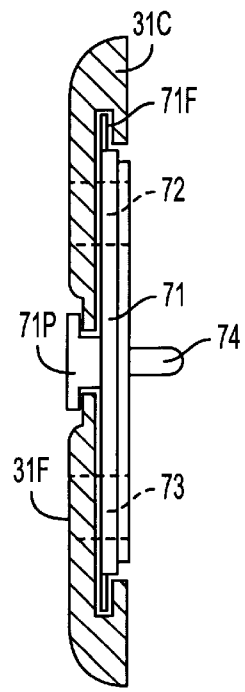
FIG. 12 is a partial cross-sectional view of the multi-battery adapter assembly along line A—A of FIG. 11.
Figure 13A:
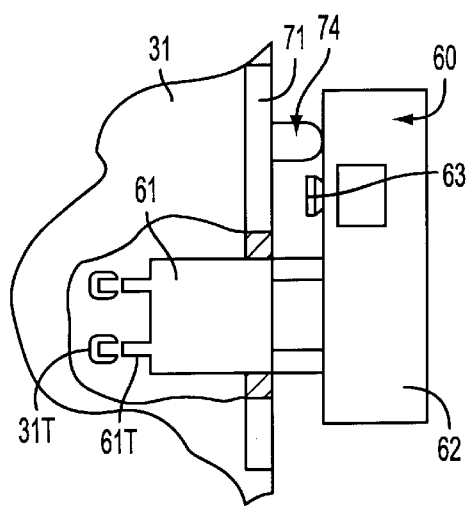
FIGS. 13A–C are partial cross-sectional views of the assembly.
Figure 13B:
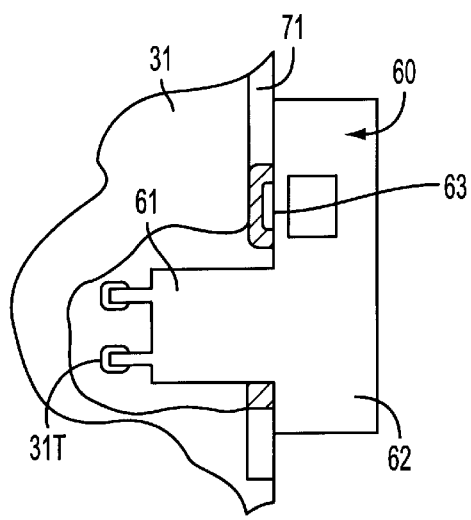
Figure 13C:
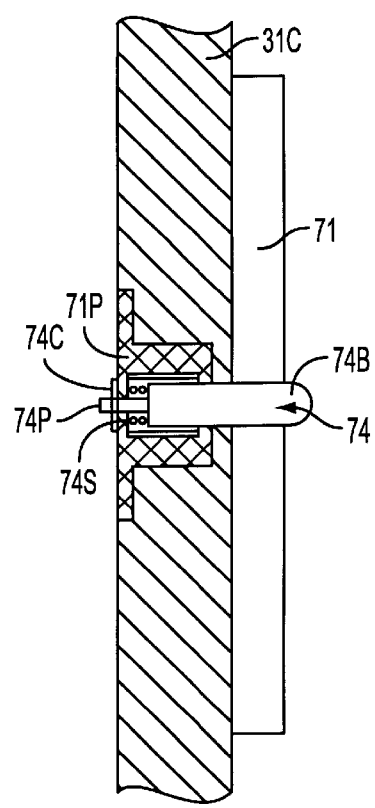

FIG. 10 illustrates a second locking mechanism for fixing the angular position of engine assembly 40, where like numerals refer to like parts. As mentioned above, shaft 32 extends through right wall 31R (not shown), engine assembly 40 and left wall 31L. Engine assembly 40 is preferably fixedly attached to shaft 32. A detent mechanism 34 may be pivotally attached to shaft 32 via pin 34P. Detent mechanism 34 preferably has a detent protrusion 34D, which may engage a notch 31N in left wall 31L.

Accordingly, the angular position of engine assembly 40 may be fixed by the location of the notch 31N engaged by protrusion 34D. To unfix the angular position, the user needs to move handle 34H until protrusion 34D clears notch 31N. The user can then change the angular position of engine assembly 40.

Persons skilled in the art should recognize that multiple angular positions of engine assembly 40 may be available by providing multiple notches 31N at different angles. Persons skilled in the art shall recognize that detent protrusion and notches could have been disposed alternatively on the wall 31L and detent mechanism 34 to achieve the same result.

Persons skilled in the art should also recognize that it is preferable to provide a spring 34S between detent mechanism 34 (preferably handle 34H) and wall 31L to bias the protrusion 34D into engagement with notch 31N. Preferably, spring 34S is an extension spring. Alternatively, spring 34S could be a compression spring if disposed in the appropriate manner.

A preferred embodiment of the engine assembly 40 is shown in FIGS. 15–25. Persons skilled in the art should refer to U.S. Pat. No. 5,754,582, which is wholly incorporated by reference herein. Engine assembly 40 may include a laser assembly 400. Laser assembly 400 may include a laser diode assembly 410, a driving assembly 420 for rotating the laser diode assembly 410, and a powering assembly 430 for powering the laser diodes in the laser diode assembly 410.

Laser diode assembly 410 preferably includes a laser diode housing 411, which is preferably made of aluminum. Laser diode housing 411 may have two cylindrical bores 412, which are preferably coplanar. (Persons skilled in the art should recognize that the number of bores 412 provided may match the number of laser diodes modules disposed in the housing. In the preferred embodiment, two laser diode modules are to be disposed in laser diode housing 411, for reasons further explained below.)

Laser diode assembly 410 may also include a barrel 413 inserted into each bore 412. Barrels 413 carry the laser diode modules 415. Preferably, the present invention employs a low cost laser diode module such as that used in laser pointers. These laser diode modules include a laser diode source and an optical system 415L disposed on barrel 413, which is preferably made of aluminum. The optical components are inexpensive and the alignment process is quick and simple. A standard low cost laser diode module consists of a laser diode 415D and a printed circuit board 415P for mounting the diode 415D. Preferably, diode 415D is Sanyo part numbers DL-3148-033 or DL-3148-034.

Printed circuit board 415P may carry a power regulation integrated circuit for limiting the power sent to laser diode 415D and/or limiting the brightness of laser diode 415D. One suitable laser diode module 415 may be the VLM-670 available from Quarton Company of Taipei, Taiwan. In a typical manufacturing process for these laser diode modules, the laser diode 415D is glued or soldered to the printed circuit board 415P.

In addition, barrel 413 may be pivotally attached to laser diode housing 411 via a pin 414, which is preferably disposed substantially horizontally. Accordingly, barrel 413 may be adjusted rotationally about pin 414, allowing the pitch of barrel 413 to be adjusted. This may be accomplished by disposing barrel 413 between a spring 417 and a set screw 416.

To adjust the barrel 413 (and thus laser diode module 415), the assembler needs only to rotate set screw 416. If screw 416 is rotated for downward movement, barrel 413 will move downwardly. On the other hand, if screw 416 is rotated for upward movement, barrel 413 will move upwardly due to spring 417. Preferably, set screw 416 is locked in place with a quick drying adhesive, such as Loc-Tite, etc. Persons skilled in the art will recognize that this adjustment methodology is preferable so that the position of the laser diode module 415 is not susceptible to disturbance due to vibration during the transportation of the laser level 10.

Persons skilled in the art will recognize that laser diode housing 411 may have a bore 417B for receiving spring 417 therein, as well as a hole 417H for facilitating insertion of spring 417 therein.

Laser diode housing 411 is preferably disposed on a shaft 419, which may be electrically charged, as explained below. Preferably, shaft 419 is made of metal, such as aluminum or steel, and carries a positive charge. A wire 419P may connect the shaft 419 to the laser printed circuit board 415P. Alternatively, laser printed circuit board 415P may be connected to barrel 413, which in turn is electrically connected to laser diode housing 411 (and shaft 419) via pin 414, screw 416 and/or spring 417.

Shaft 419 may be hollow to carry a negative wire 415N. Negative wire 415N preferably extends through shaft 419 and barrel 413, and is connected to the laser printed circuit board 415P.

Shaft 419 may be rotatably supported by a vial assembly 450, which includes vial plate 451. Preferably, a bearing 419B is disposed on vial plate 451. Bearing 419B may rotatably receive shaft 419 therethrough. Persons skilled in the art will recognize that bearing 419B minimizes friction between shaft 419 and vial plate 451. In addition, bearing 419B may be pre-loaded axially to reduce clearances within the bearing itself. Lack of bearing pre-load may result in calibration drift, affecting the accuracy of laser assembly 400.

In addition, an insulating layer 419I may be disposed between bearing 419B and vial plate 451. In this manner, the electrical charge of shaft 419 will not be conducted to vial plate 451 and/or vial assembly 450. Alternatively, electrostatic discharge (ESD) from exposed metal surfaces will not be conducted to the diodes 415D, which may be sensitive to ESD.

It is preferable to provide a cap 418 on laser housing 411 to prevent users from touching and/or viewing wires 415N, 419P. Preferably, cap 418 is made of an insulating material, such as rubber or plastic, and is designed so that it snaps onto housing 411.

Persons skilled in the art will recognize that the laser beam LB may have a cross-section that is longer along a first axis than along a substantially perpendicular axis. In other words, its height may be larger than its width (see, e.g., beam spot LBV in FIG. 26), etc. This is because the laser emission is generated by light oscillating at resonance within an active semiconductor layer, that is sandwiched between two internally highly reflective semiconductor faces. Collimating optics in the laser diode module 415 may reshape this light into a more equal-dimensioned beam. However, even after collimation, the laser beam LB is not perfectly circular.

Figure 26:
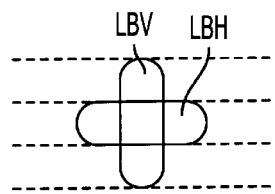
FIG. 26 is a diagrammatic view of the laser beam.

It is preferable thus to align the laser diode module 415 so that the longer axis of the beam spot is disposed substantially horizontally, i.e., along and/or coplanar to the laser light plane generated by the laser level 10 (see, e.g., beam spot LBH in FIG. 26). This minimizes the height of the laser beam, providing for a more exact, or "crisper," laser light plane.

Such result can be achieved, for example, as follows. First, the orientation of the semiconductor material layers within the laser crystal must be identified. The orientation is typically fixed with respect to three electrical pins on the laser diode 415D. Once the orientation of the layers and pins has been identified, the printed circuit board 415P may be designed to receive the laser diode 415D in a certain rotational position. Printed circuit board 415P may also be provided with an indexing tab 415I. This tab 415I fits in a slot (not shown) in barrel 413, fixing the rotational position of the laser diode module 415 relative to the laser diode housing 411. Accordingly, the laser diode module 415 can be consistently installed so that the longer axis of the beam spot is disposed substantially horizontally, i.e., along and/or coplanar to the laser light plane generated by the laser level 10. Persons skilled in the art shall recognize that the tab and slot may be alternative provided on barrel 413 and printed circuit board 415P, respectively.

Persons skilled in the art should recognize that wall 41 of engine assembly 40 substantially encloses and/or protects laser assembly 400. Slots 41S may be disposed on wall 41 to allow laser beam LB to exit therefrom.

Preferably, laser assembly 400 has two diode modules 415. One reason for such arrangement is the added intensity of the resulting laser beam plane.

Figure 14:
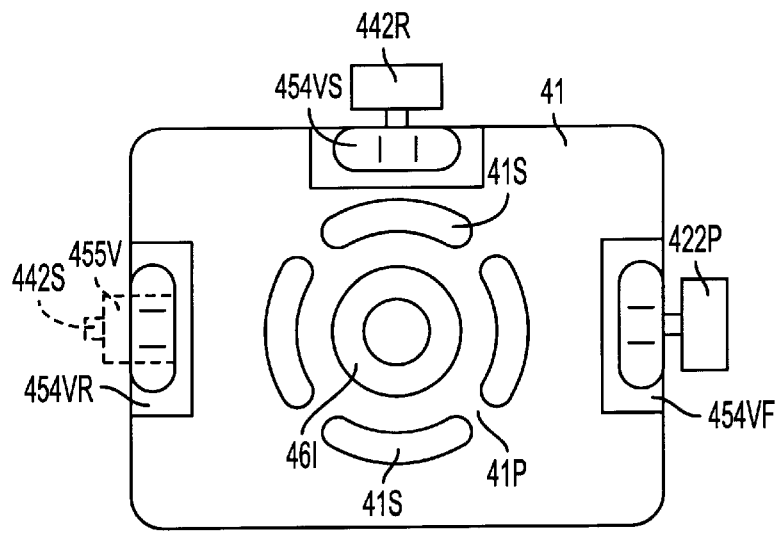
FIG. 14 is a top plan view of the engine assembly.

Another reason is that having two diode modules 415 will prevent any unlighted spots on the laser beam plane. As shown in FIG. 14, the slots 41S are preferably separated by posts 41P. Preferably the width of posts 41P is such that, when one laser diode module 415 is blocked by one post 41P, the other laser diode module 415 projects a laser beam LB that exists through slot 41S.

As mentioned above, powering assembly 430 provides power to laser diode modules 415. Powering assembly 430 may include a slip ring 431, which is preferably integrated. Preferably, slip ring 431 is fixedly disposed to a floor 441. A bracket 432 may be used to fix slip ring 431 unto floor 441.

Slip ring 431 may receive power through positive wire 431WP and negative wire 431WN. The slip ring 431 may be electrically connected to a shaft 433, via brushes 431B, rendering shaft 433 with a particular electrical potential. Shaft 433 is preferably made of metal, such as steel or aluminum. Preferably, shaft 433 has a positive voltage.

Slip ring collar 434 may be disposed at and electrically connected to the upper end of shaft 433. Persons skilled in the art will recognize that slip ring collar 434 is also electrically charged. A dual constant velocity joint (or universal joint) may connect the slip ring collar 434 to a pulley 422, as explained below. A light spring 435 may bridge the electrical gap between the slip ring collar 434 and pulley 422. Spring 435 may also slightly preload the joint to eliminate backlash.

As mentioned above, driving assembly 420 is provided for rotating laser assembly 410. Driving assembly 420 may include a motor 424 driving a shaft 424S and a pulley 424P disposed thereon. Pulley 424P may drive a belt 423, which drives pulley 422. Pulley 422 is preferably fixedly attached to shaft 419. Accordingly, when motor 424 rotates shaft 424S, it will drive pulley 422 and rotate shaft 419.

Figure 35A:
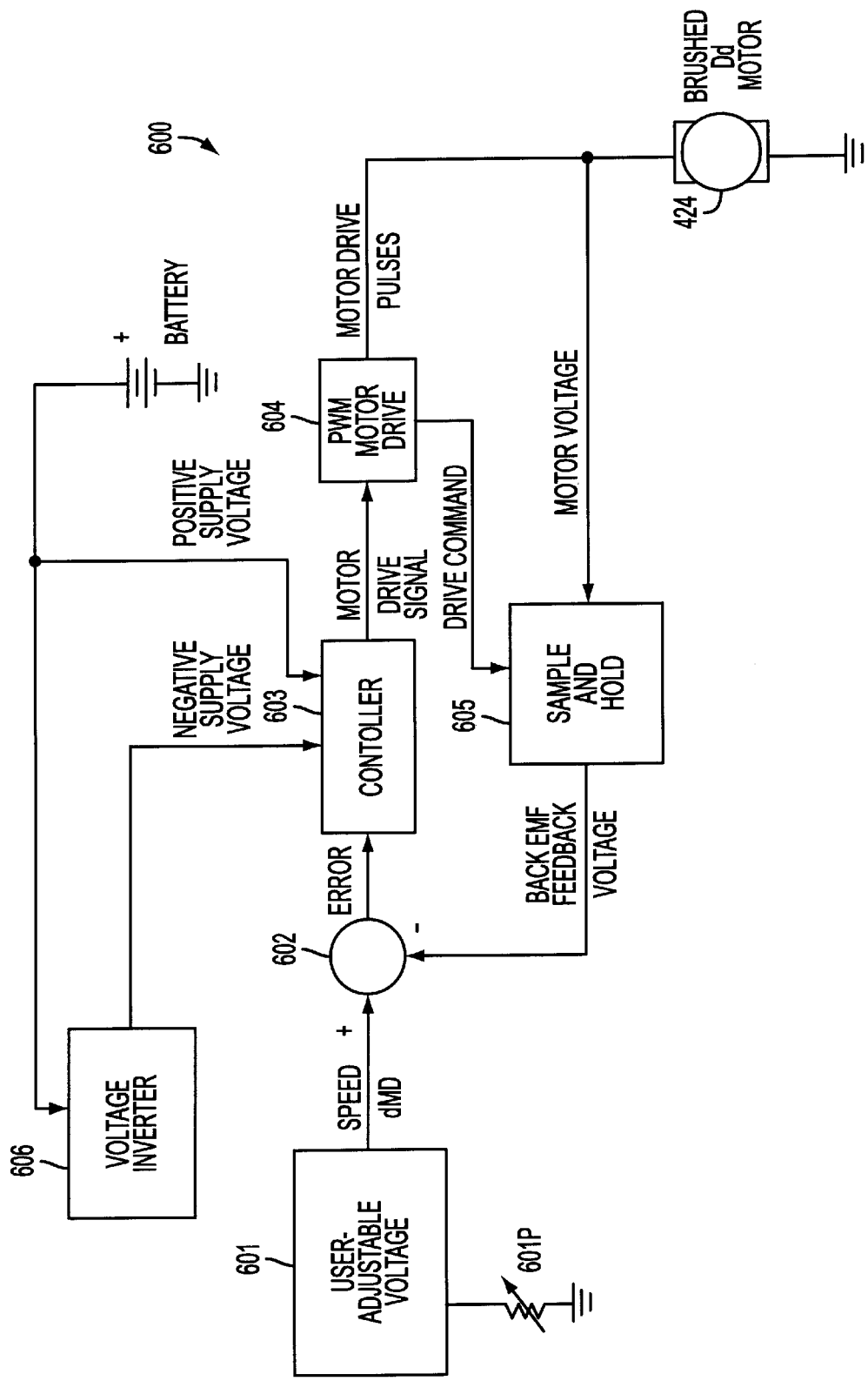
FIG. 35A is a block diagram of the circuit.

Motor 424 may be supported by vial assembly 450, plate 451 and/or by a bracket connected thereto. The motor 424 is preferably controlled and/or driven by a pulse width modulation (PWM) circuit, which is shown in FIG. 35A as a block diagram, and in FIG. 35B as a circuit schematic.

The user adjustable voltage 601 includes a potentiometer 601P, which can be moved by a user. The potentiometer 601P varies the selected voltage between a top voltage representative of the top rotational speed of motor 424, and a bottom voltage, where the motor 424 does not rotate. Preferably, the bottom voltage is slightly negative.

The selected voltage is then fed to a summer 602, which substracts the motor's back electromotive force (emf) feedback voltage from the selected voltage. The emf voltage is determined by the sample and hold 605 as follows. Persons skilled in the art will recognize that motor 424 is driven by pulses. The longer and/or the more frequent the pulses, the longer the motor 424 runs on electricity, allowing it to accelerate.

When the motor 424 is not driven by a pulse, the motor 424 acts as an inductor and creates a flyback (negative) voltage. This flyback voltage is then shunted.

When the flyback voltage is shunted, motor 424 is freewheeling and generating voltage. In particular, motor 424 generates back emf voltage, which is relatively proportional to the rotational speed of motor 424. The sample and hold 605 then samples the back emf voltage, holds it and then sends it summing junction 602.

Summing junction 602 generates an error signal which goes into controller 603. Controller 603 then sends a drive signal to the PWM motor drive 604, which sends out the drive pulses to drive motor 424. The PWM motor drive 604 also sends a signal indicating that it is driving motor 424 to the sample and hold 605. In this manner, sample and hold 605 does not sample the voltages created by motor 424 at the same time the PWM motor drive 604 is driving the motor 424.

Sample and hold 605 also has another circuit that monitors the flyback voltage, to prevent sampling thereof. Once the flyback voltage is shunted, sample and hold 605 can sample the back emf voltage.

Persons skilled in the art should recognize that controller 603 may require both positive and negative supply voltages. Since the laser level 10 is preferably battery powered, a voltage inverter 606 has been provided to invert the battery voltage, thus providing the negative supply voltage to controller 603.

Figure 35B:
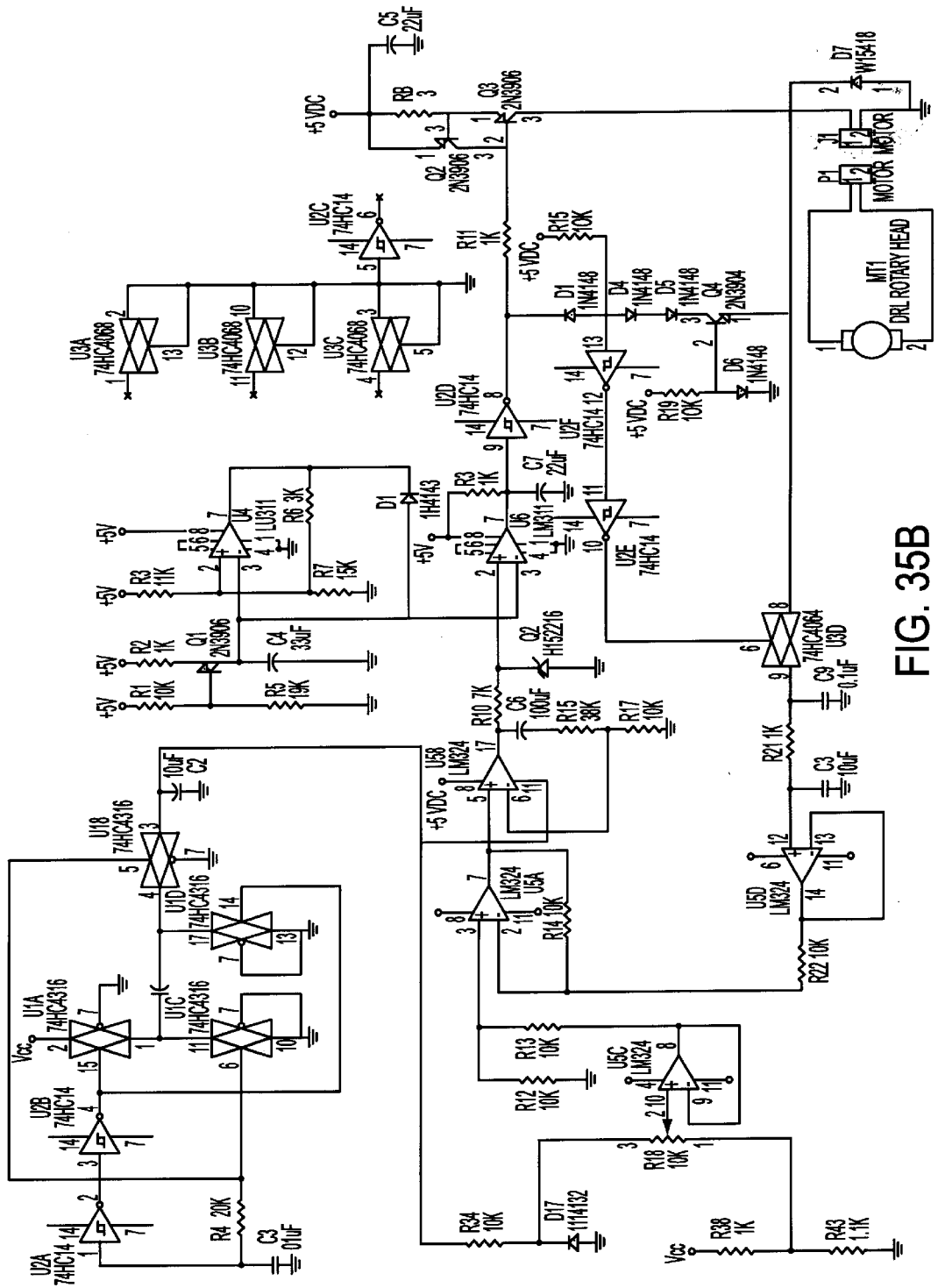
FIG. 35B is the circuit schematic for such circuit.

Persons skilled in the art will recognize that FIG. 35B illustrates one possible implementation of the circuit diagrammed in FIG. 35A. Persons skilled in the art will also be able to build and analyze the operation of the circuit shown in FIG. 35B. The values of the different components shown in the schematics are as follow:

| | |
|---|---|
| C1 | 10 μF |
| C2 | 10 μF |
| C3 | 01 μF |
| C4 | 33 μF |
| C5 | 22 μF |
| C6 | 100 μF |
| C7 | 22 μF |
| C9 | 01 μF |
| C10 | 10 μF |
| D1 | 1N4148 |

-continued

| | |
|---|---|
| D2 | 1N5228 |
| D3 | 1N4148 |
| D4 | 1N4148 |
| D5 | 1N4148 |
| D6 | 1N4148 |
| D7 | 1N5818 |
| D17 | 1N4148 |
| Q1 | 2N3906 |
| Q2 | 2N3906 |
| Q3 | 2N3906 |
| Q4 | 2N3904 |
| R1 | 10 KΩ |
| R2 | 1 KΩ |
| R3 | 11 KΩ |
| R4 | 20 KΩ |
| R5 | 39 KΩ |
| R6 | 3 KΩ |
| R7 | 15 KΩ |
| R8 | 3 Ω |
| R9 | 1 KΩ |
| R10 | 1 KΩ |
| R11 | 1 KΩ |
| R12 | 10 KΩ |
| R13 | 10 KΩ |
| R14 | 10 KΩ |
| R15 | 38 KΩ |
| R16 | 10 KΩ |
| R17 | 10 KΩ |
| R18 | 10 KΩ |
| R19 | 10 KΩ |
| R21 | 1 KΩ |
| R22 | 10 KΩ |
| R38 | 1 KΩ |
| P39 | 10 KΩ |
| R43 | 1.1 KΩ |
| U1 | 74HC4316 |
| U2 | 74HC14 |
| U3 | 74HC4066 |
| U4 | LM311 |
| U5 | LM324 |
| U6 | LM311 |

Persons skilled in the art will recognize that in the circuit shown in FIG. 35B, integrated circuits U2A, U2B and U1 are configured as a switched capacitor voltage converter to generate a negative voltage for the operational amplifier U2 and the low end of the command signal (to ensure head rotation stops when the speed adjustment potentiometer, R18, is turned off). Q1, U4 and U6 are configured as a PWM drive. The duty cycle is controlled by the controller output (the voltage at U6, pin 2). Q3 is the motor drive transistor and Q2 combined with R8 limit the drive current to approximately 230 mA. U3D and C9 are a sample and hold circuit. Sampling is allowed when the drive pulse is off (U2, pin 8) and when the motor coil flyback pulse is over (controlled by D4, D5, D6 and Q4). R21 and C8 forms low pass filter to reduce sampling noise. U5D buffers the feedback voltage. U5C buffers the command voltage. U5A subtracts the feedback from the command to create an error signal. U5B is a proportional and integral controller that commands the PWM circuitry to drive the error signal to zero. This holds the rotary head speed constant at a speed controlled by the user adjusting R18.

Persons skilled in the art should recognize that most of the circuit shown in FIG. 35 should be disposed within frame assembly 30.

In addition, driving assembly 420 may include a coupling link 421, which is preferably disposed on slip ring collar 434. Link 421 may be made of a non-conductive material, such as plastic. As shown in FIGS. 16–18, link 421 has at least one upper protrusion 421P and at least one lower protrusion 421LP extending from a shaft 421S. Preferably, link 421 has four upper protrusions 421P extending in a cross formation from shaft 421S. Similarly, link 421 may have four lower protrusions 421LP extending in a cross formation from shaft 421S. Preferably, link 421 is injection molded to obtain the desired shape.

Lower protrusions 421LP may be disposed in a similarly shaped area of slip ring collar 434. Preferably, a gap 434G exists between lower protrusion 421LP and slip ring collar 434 to allow some rotational play therebetween.

Similarly, upper protrusions 421P may be disposed in a similarly shaped area of pulley 422. Preferably, a gap 422G exists between lower protrusion 421LP and pulley 422 to allow some rotational play therebetween.

Because of the shape of the protrusions 421P, 421LP, the shape of the slots in pulley 422 and slip collar 434, and the gaps 422G, 434G therebetween, rotary motion between shaft 419 and pulley 422 is transmitted through link 421 to shaft 433. Accordingly, this system behaves like a double-knuckle joint, compensating for misalignment between the slip ring 431, the shaft 433 and pulley 422 via six degrees of freedom (three translational degrees and three rotational degrees). This also minimizes stress on the slip ring 431.

Figure 15:
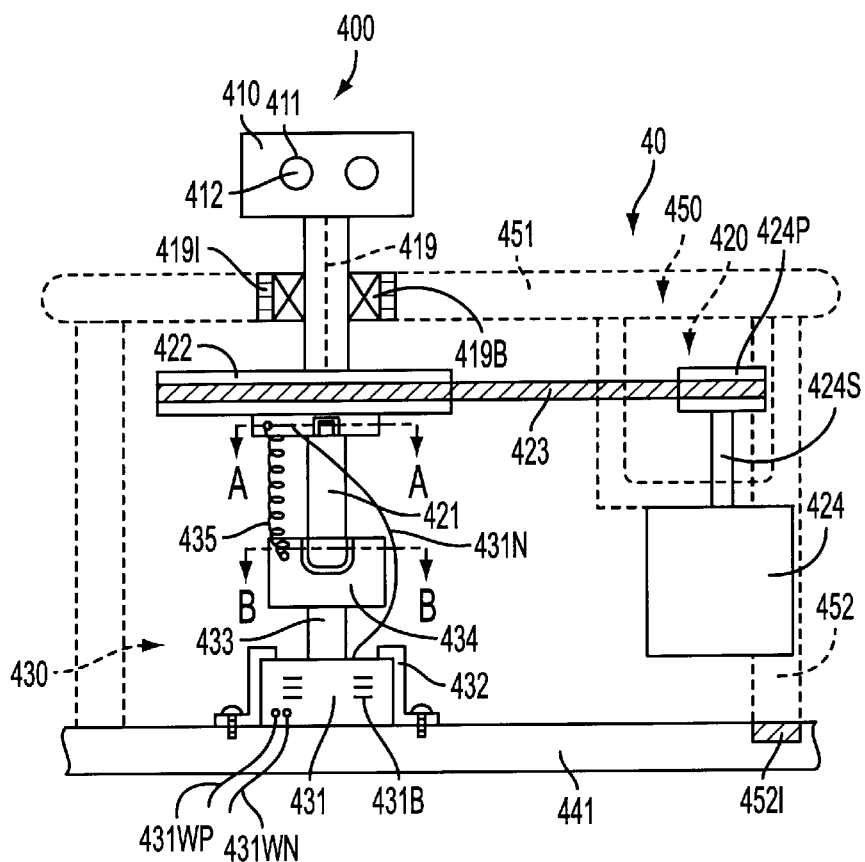
FIG. 15 is a partial front view of a laser assembly along line A—A of FIG. 8A.

Referring to FIG. 15, as mentioned above, slip collar 434 is electrically charged. This charge may be transmitted to pulley 422 via a spring 435. Shaft 419 is then charged due to the electrical connection between pulley 422 and shaft 419. Persons skilled in the art will recognize that spring 435 may also serve to maintain alignment between slip collar 434 and pulley 422.

On the other hand, a wire 431N exiting slip ring 431 may carry the opposite charge to laser diode module 415. If shaft 419 is charged positively, then wire 431N carries the negative charge. Wire 431N preferably bypasses shaft 433 and slip collar 434, and enters shaft 419 through pulley 422. As mentioned above, shaft 419 is hollow, allowing wire to extend therethrough until it is electrically connected to wire 415N.

Figure 21:
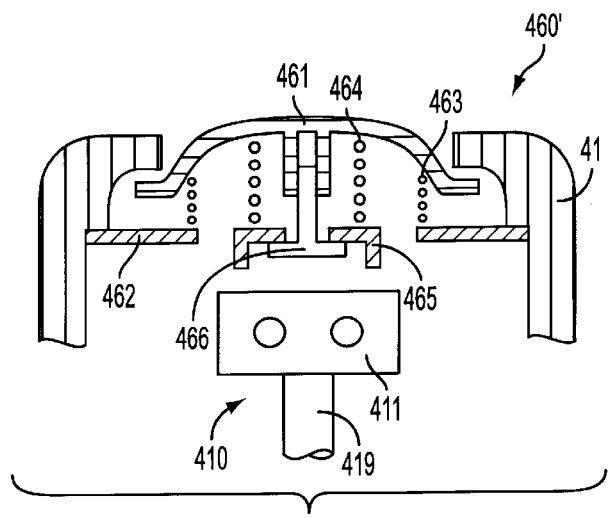
FIG. 21 is an alternate cross-sectional view along line D—D of FIG. 8B.
Figure 19:
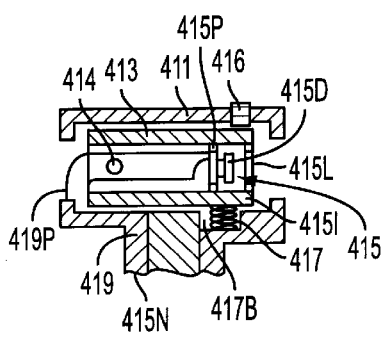
FIG. 19 is a cross-sectional view along line X—X of FIG. 20.
Figure 22:
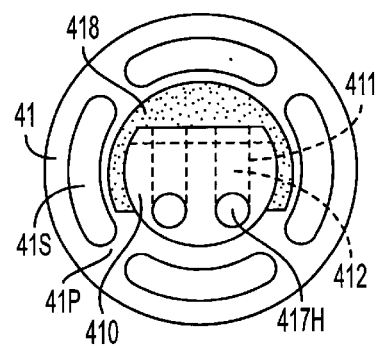
FIG. 22 is a partial top plan view along line E—E of FIG. 8C.
Figure 20:
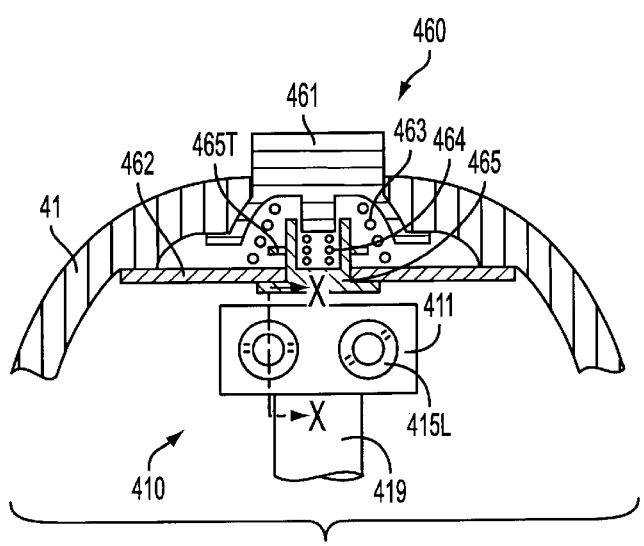
FIG. 20 is a cross-sectional view along line D—D of FIG. 8B

Referring to FIGS. 20–21, manual adjustment assemblies 460, 460' may be provided on engine assembly 40, for manually rotating laser assembly 410. Referring to FIG. 20, a plate 462 may be fixedly attached to wall 41 of engine assembly 40. Preferably, plate 462 is riveted unto wall 41. An adjustment knob 461 may be disposed between wall 41 and plate 462, and extend through the top of engine assembly 40. A spring 463 is preferably disposed between knob 461 and plate 462. A plunger 465 may be disposed under knob 461. Plunger 465 may extend through plate 462 for contacting laser diode housing 411. Preferably, the plunger areas that contact laser diode housing 411 are rubberized, or covered with a high friction material. Alternatively, plunger 465 is made of rubber. Tabs 465T may capture plunger 465 between plate 462 and knob 461. A spring 464 may be disposed between plunger 465 and knob 461.

Accordingly, if the user wants to adjust the location of laser diode housing 411, the user needs only to press knob 461 downwardly, forcing plunger 465 into contact with laser diode housing 411. The user can then rotate laser diode housing 411 by rotating knob 461. The user cannot overload the laser diode housing 411 because the spring preferably 464 maintains a controlled contact force between plunger 465 and laser diode housing 411. In addition, adjustment knob 461 and/or spring 463 preferably bottom out on plate 462 before spring 464 is fully compressed.

As shown in FIG. 21, adjustment assembly 460' is similar to adjustment assembly 460, where like numerals refer to like parts. The main difference between the two embodiments is tha plunger 465 is retained by retaining pin 466, rather than tabs 465T contacting plate 462. Preferably, pin 466 is fixedly attached to knob 461.

Referring to FIGS. 8, 14–15 and 23, vial assembly 450 preferably has a vial plate 451 and pedestals 452 for supporting vial plate 451 on floor 441. Preferably, an insulation pad 452I is disposed between pedestals 452 and floor 441 for electrically insulating vial assembly 450 from floor 441.

Vial plate 451 may carry multiple spirit vials thereon to indicate whether vial plate 451 and/or laser diode modules 415 are in a substantially horizontal plane. Preferably, vial plate 451 carries at least three horizontal vials 454VF, 454VS, 454VR and one vertical vial 455V. The horizontal vials 454VF, 454VS, 454VR are preferably disposed on the front, right and rear walls of engine assembly 40. Vertical vial 455V may be disposed on the rear wall of engine assembly 40.

Suitable vials for this application may be parts nos. 0349 and/or 0224 made by Empire Level Mfg. Corp. of Milwaukee, Wis. Alternatively, the vials can be custom made by bending or grinding, as is well known in the art, so long as the desired dimensional requirements are met.

In the present case, the main dimensional requirements for the vials are length, diameter and angular sensitivity. Persons skilled in the art will recognize that length and diameter are dependent upon the size of the desired vial.

As to angular sensitivity, persons skilled in the art will recognize that the angular sensitivity of the vials is identified by "minutes", as in "one-minute vials." The vials used in laser level 10 may be more accurate, equally accurate or less accurate than one-minute vials. Preferably, the vials used in the laser level 10 are one-minute vials, five-minute vials, six-minute vials, or any other vials with an angular sensitivity between the one-minute vials and the six-minute vials.

Such arrangement is advantageous for several reasons. First, when engine assembly 40 is in the vertical position, the user may want to check vials 454VS and 454VF and/or 454VR to determine whether the laser diode modules 415 are level. However, when engine assembly 40 is in the horizontal position, the user may not be able to check vials 454VS and/or 454VF. The user can nevertheless confirm whether laser diode modules 415 are substantially vertical, or "plumb," by checking vials 454VR and 455V, which are now laying subtantially horizontally on the rear face.

Another reason for providing parallel vials 454VF, 454VR is to provide redundant alignment indication. In other words, both vials may be calibrated to indicate level when the laser beam plane is horizontal. If the laser level 10 is disturbed violently enough for one of the vials to become uncalibrated with respect to the laser beam plane, the user can notice such problem by comparing both vials 454VF, 454VR.

Referring to FIG. 23, vials 454VR, 455V may be attached to vial holders 454, 455. Preferably, the vials 454VR, 455V are glued with optical glue to the vial holders 454, 455.

Vial holder 454 may be pivotally attached to vial plate 451 via pin 454P. Alternatively, vial holder 454 may be flexibly attached to vial plate 451 via a flexible junction or flexure. The flexible junction may be integral with vial holder 454 and/or vial plate 451, or it may be bonded to vial holder 454 and/or vial plate 451. Persons skilled in the art should recognize that the flexure may be mounted to the vial plate, and a vial may be bonded on the flexure.

An adjustment screw 454B may extend through vial plate 451 and threadingly engage vial holder 454. A spring 454S may be disposed between vial plate 451 and vial holder 454. Preferably, spring 454S is a compression spring. Spring 454S may be disposed along or outside screw 454B. Accordingly, when the screw 454B is rotated, vial holder 454 will pivot about pin 454P. Spring 454S will maintain the vial holder 454 in the desired position.

Persons skilled in the art will recognize that screw 454B may threadingly engage and extend through vial holder 454 and contact (rather than extend through) vial plate 451. Alternatively, screw 454B may extend through vial holder 454 and threadingly engage vial plate 451.

Similarly, vial holder 455 may be pivotally attached to vial plate 451 via a pin 455P. Alternatively, vial holder 455 may be flexibly attached to vial plate 451 via a flexible junction or flexure. The flexible junction may be integral with vial holder 455 and/or vial plate 451, or it may be bonded to vial holder 455 and/or vial plate 451. Persons skilled in the art should recognize that the flexure may be mounted to the vial plate, and a vial may be bonded on the flexure.

A pedestal or protrusion 453 may extend downwardly from vial plate 451. A screw 455B may extend through protrusion 452 and threadingly engage vial holder 455. A spring 455S may be disposed between vial plate 451 and vial holder 455. Preferably, spring 455S is a compression spring. Spring 455S may be disposed along or outside screw 455B. Accordingly, when the screw 455B is rotated, vial holder 455 will pivot about pin 455P. Spring 455S will maintain the vial holder 455 in the desired position.

Persons skilled in the art will recognize that screw 455B may threadingly engage and extend through vial holder 455 and contact (rather than extend through) vial plate 451. Alternatively, screw 455B may extend through vial holder 455 and threadingly engage vial plate 451.

Once the vials are adjusted, the screws 454B, 455B may be locked in place with a quick-drying adhesive, such as Loc-Tite.

Persons skilled in the art should recognize that the other vials may be adjusted in a similar manner.

Referring to FIGS. 24–25, persons skilled in the art should also recognize that a leveling mechanism 440 is preferably provided for adjusting the plane upon which laser assembly 410 rests, in order to ensure that the laser beam plane is substantially horizontal or substantially vertical. Leveling mechanism 440 includes floor 441 upon which laser assembly 410 and/or vial assembly 450 rest thereon. Floor 441 may be disposed over a plate 443. Plate 443 may have holes 443S for receiving shaft 32 therethrough.

Preferably, floor 441 and plate 443 are connected. A screw 448 may threadingly engage floor 441 and contact plate 443. A spring 448S may be disposed between the head 448H of screw 448 and floor 441 for biasing floor 441 downwardly towards plate 443. Similarly, a screw 446 may threadingly engage plate 443 and contact floor 441. A spring 446S may be disposed between the head 446H of screw 446 and plate 443 for biasing plate 443 upwardly towards floor 441. Accordingly, the distance between floor 441 and plate 443 may be adjusted by rotating screws 448 and/or 446. A spring 447 may also be disposed between floor 441 and plate 443.

Preferably, floor 441 carries a pitch shaft 442PS, which can be rotated via pitch knob 442P. Shaft 442PS may be threadingly engaged to moveable pitch cam 442PC, so that when shaft 442PS is rotated, moveable pitch cam 442PC travels along the longitudinal axis of pitch shaft 442PS. Moveable pitch cam 442PC preferably contacts fixed pitch cam 443PC of plate 443. As shown in FIG. 24, at least one of pitch cams 442PC, 443PC may have ramps for forcing moveable pitch cam 442PC (and floor 441) to move upwardly or downwardly. Persons skilled in the art should recognize that pitch shaft 442PS and moveable pitch cam 442PC may be disposed on plate 443, while fixed pitch cam 443PC may be disposed on floor 441. Such arrangement allows the user to change the pitch angle of floor 441, i.e., to move the front of floor 441 upwardly while moving the rear of floor 441, or vice versa.

Persons skilled in the art will recognize that fixed pitch cam 443PC may be replaced by a pitch pin 443PP supported by walls extending from plate 443. Pitch pin 443PP would function in the same manner as fixed pitch cam 443PC, except that pitch pin 443PP would be less sensitive to any rotational or angular variance of moveable pitch cam 442PC.

Floor 441 may also carry a roll shaft 442RS, which can be rotated via roll knob 442R. Shaft 442RS may be threadingly engaged to moveable roll cam 442RC, so that when shaft 442RS is rotated, moveable roll cam 442RC travels along the longitudinal axis of pitch shaft 442RS. Moveable roll cam 442RC preferably contacts fixed roll cam 443RC of plate 443. As shown in FIG. 25, at least one of roll cams 442RC, 443RC may have ramps for forcing moveable roll cam 442RC (and floor 441) to move upwardly or downwardly. Persons skilled in the art should recognize that roll shaft 442RS and moveable roll cam 442RC may be disposed on plate 443, while fixed roll cam 443RC may be disposed on floor 441. Such arrangement allows the user to change the roll angle of floor 441, i.e., to move the left side of floor 441 upwardly while moving the right side of floor 441, or vice versa.

Persons skilled in the art will recognize that fixed roll cam 443RC may be replaced by a roll pin 443RP supported by walls extending from plate 443. Roll pin 443RP would function in the same manner as fixed roll cam 443RC, except that roll pin 443RP would be less sensitive to any rotational or angular variance of moveable roll cam 442RC.

Figure 27A:
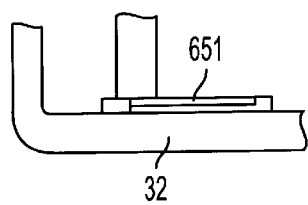
FIG. 27A is a bump sensor assembly.
Figure 27B:
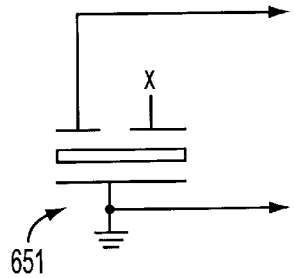
FIG. 27B is a circuit schematic of the bump sensor assembly.
Figure 27C:
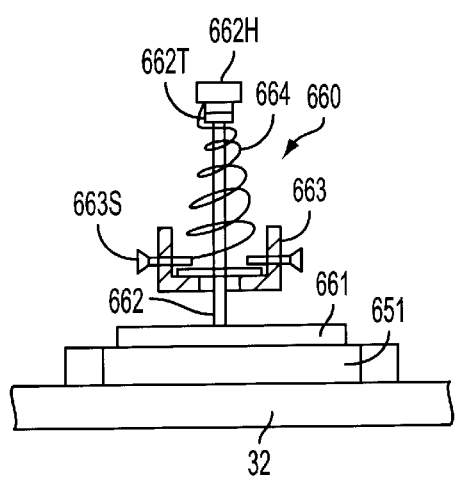
FIG. 27C is a bump sensor assembly including a mechanical amplifier assembly.
Figure 28:
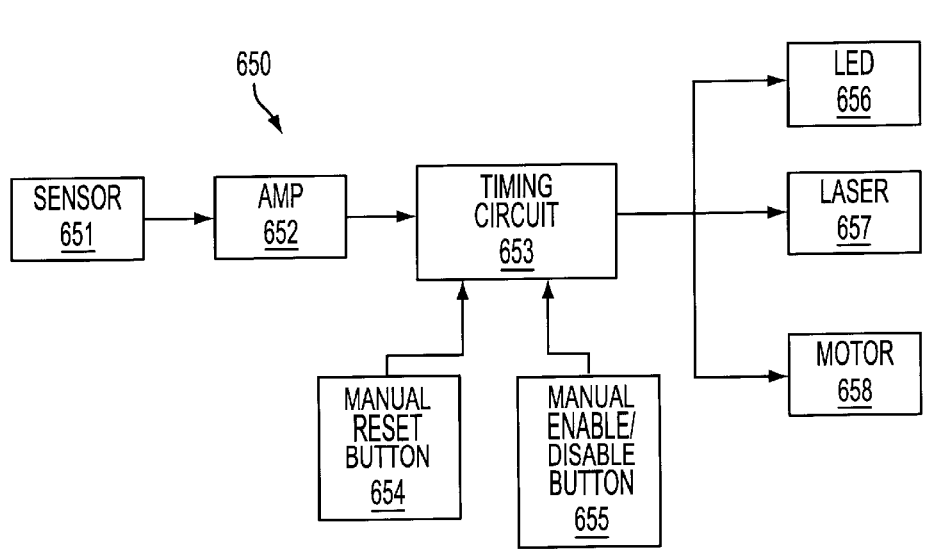
FIG. 28 is a block diagram illustrating a bump sensor circuit.

Referring to FIGS. 27–29, laser level 10 preferably has a bump sensor assembly 650 for indicating that the laser level 10 has been hit or bumped, and potentially knocked out of level alignment. Bump sensor assembly 650, and its circuit, are preferably disposed on frame assembly 30.

Bump sensor assembly 650 preferably has a sensor 651. Sensor 651 is preferably a thin piezoelectric element firmly mounted inside wall 32 of frame assembly 30. Such element is typically used in piezoelectric buzzers, and may consist of a thin slice of piezoceramic material sandwiched between two electrical contact plates. When the piezoceramic element is stressed mechanically, it generates an electrical charge across the contact plates. Piezoelectric elements do not typically respond to steady-state stress.

Accordingly, when laser level 10 is bumped, the piezoceramic element is stressed, which in turn generates an electrical charge across the contact plates. An amplifier 652 with a preferably high input impedance may electrically buffer, low-pass filter and/or amplify the output of sensor 651. A voltage at the amplifier output exceeding a predetermined threshold, such as approximately 70% of the circuit supply voltage, may trigger the timing circuit 653 to activate the alarms. Timing circuit 653 may include a flip-flop. Accordingly, if the amplifier output voltage is above the threshold, the flip-flop may be tripped and latched.

The timing circuit 653 then may cause a light emitting diode (LED) 656 to flash until manual reset button 654 is activated. Similarly, timing circuit 653 may disable motor 658 (which preferably is motor 424) and/or may cause laser 657 (which preferably is laser diode module 415) to flash. Such alarms would indicate to the user that the laser level 10 may be out of alignment. Again, the motor 658 and/or laser 657 may be reset when manual reset button 654 is activated.

Bump sensor assembly 650 may also include a manual enable/disable button 655 for allowing the user to enable and/or disable the bump sensor as desired.

Figure 29A:
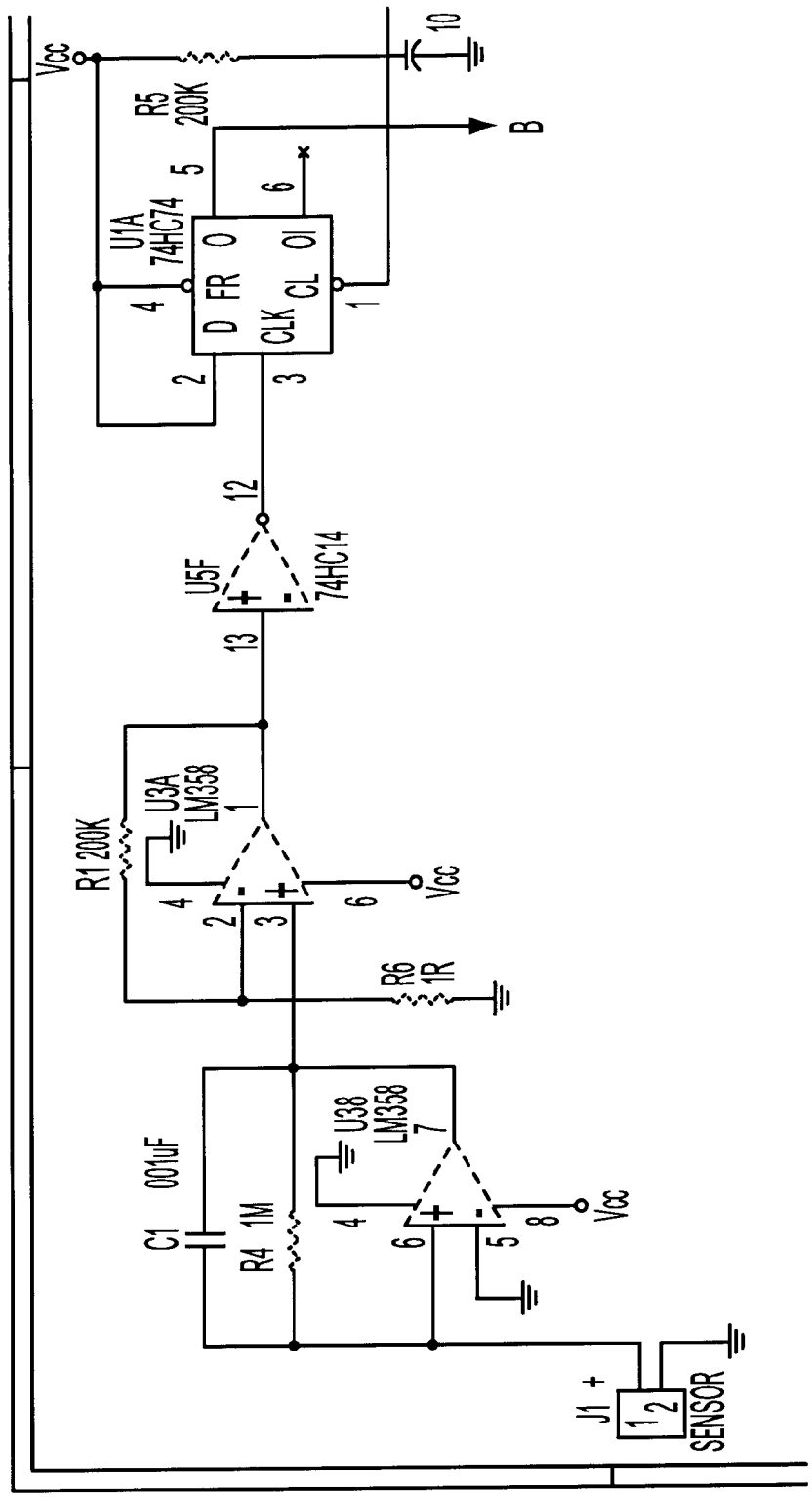
FIGS. 29A–C illustrate different portions of the bump sensor circuit, where leads B and C in FIG. 29A connect to leads B and C in FIG. 29C, and lead A in FIG. 29B connects to lead A in FIG. 29C.
Figure 29B:
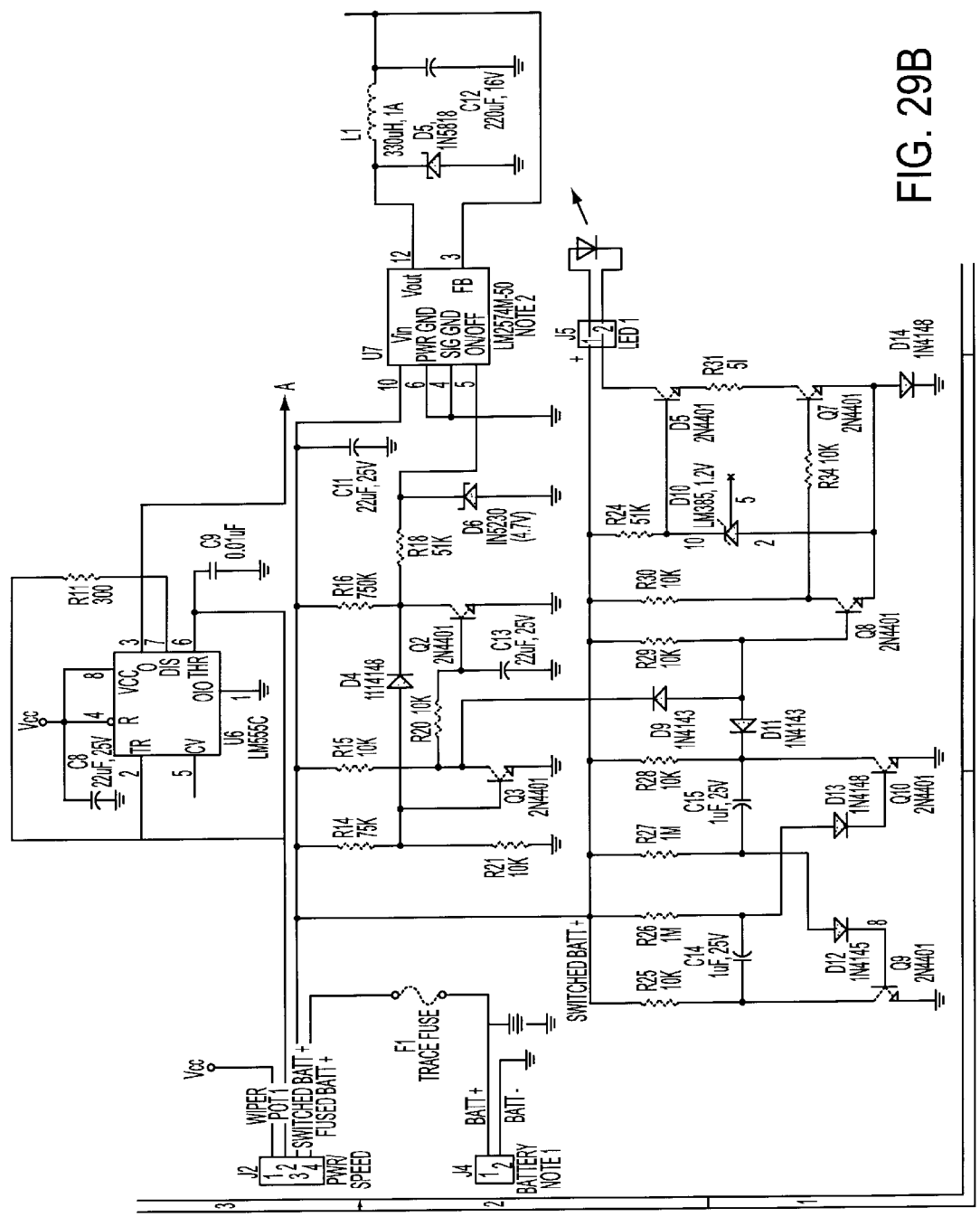
Figure 29C:
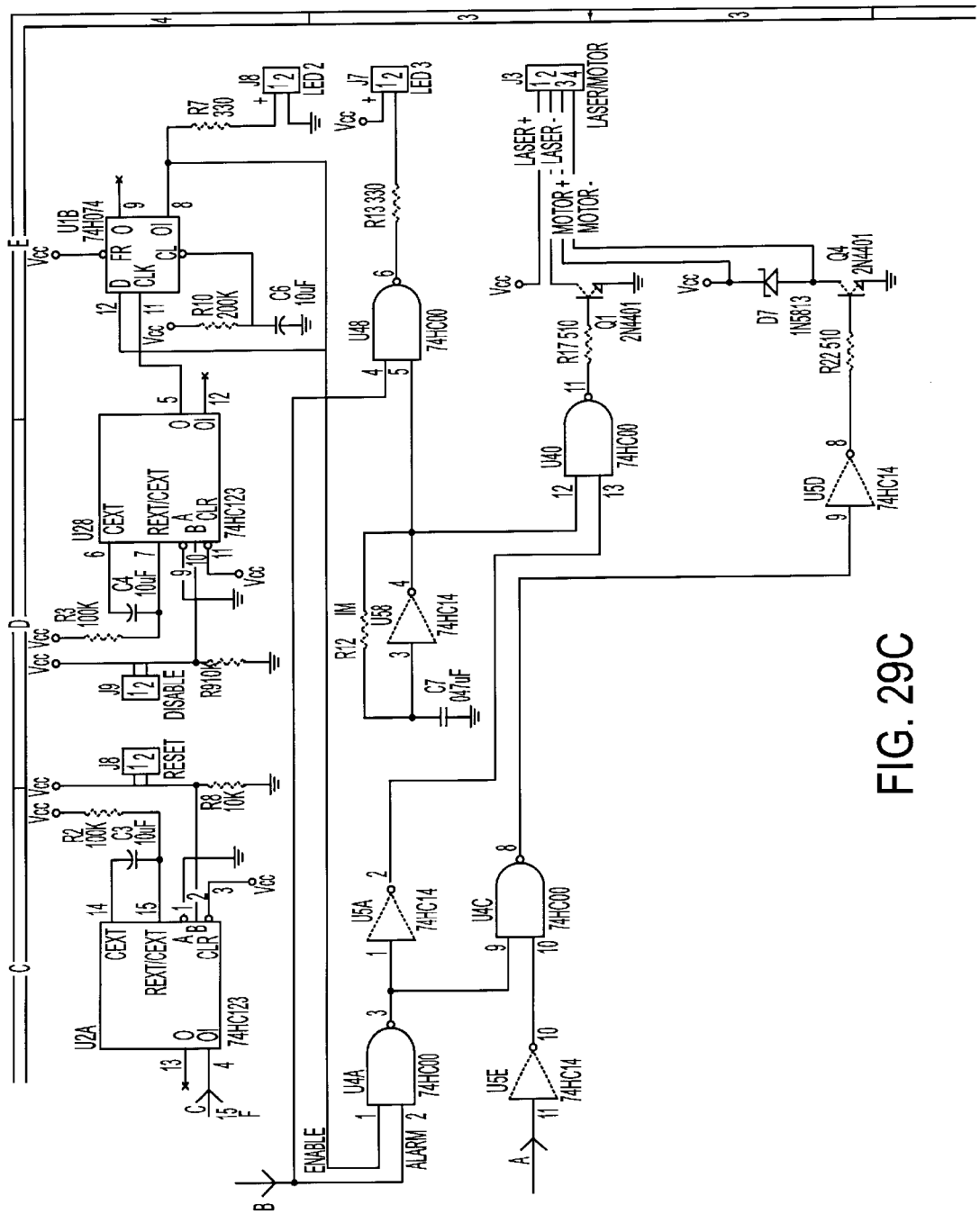

Persons skilled in the art will recognize that FIGS. 29B–D illustrate one possible implementation of the circuit diagrammed in FIG. 29A. Persons skilled in the art will also be able to build and analyze the operation of the circuit shown in FIG. 29D. The values of the different components shown in the schematics are as follow:

| | |
|---|---|
| C1 | 0.01 $\mu$F |
| C3 | 10 $\mu$F |
| C4 | 10 $\mu$F |
| C5 | 10 $\mu$F |
| C6 | 10 $\mu$F |
| C7 | 0.47 $\mu$F |
| C8 | 22 $\mu$F |
| C9 | 0.01 $\mu$F |
| C11 | 22 $\mu$F.25 V |
| C12 | 220 $\mu$F.16 V |
| C13 | 22 $\mu$F.25 V |
| C14 | 1 $\mu$F.25 V |
| C15 | 1 $\mu$F.25 V |
| D4 | 1N4148 |
| D5 | 1N5818 |
| D6 | 1N5230 |
| D7 | 1N5813 |
| D9 | 1N4148 |
| D10 | LM385 -1.2 |
| D11 | 1N4148 |
| D12 | 1N4148 |
| D13 | 1N4148 |
| D14 | 1N4148 |
| L1 | 330 $\mu$H.1 A |
| Q1 | 2N4401 |
| Q2 | 2N4401 |
| Q3 | 2N4401 |
| Q4 | 2N4401 |
| Q5 | 2N4401 |
| Q7 | 2N4401 |
| Q8 | 2N4401 |
| Q9 | 2N4401 |
| Q10 | 2N4401 |
| R1 | 200 K$\Omega$ |
| R2 | 100 K$\Omega$ |
| R3 | 100 K$\Omega$ |
| R4 | 1 M$\Omega$ |
| R5 | 200 K$\Omega$ |
| R6 | 1 K$\Omega$ |
| R7 | 330 $\Omega$ |
| R8 | 10 K$\Omega$ |
| R9 | 10 K$\Omega$ |
| R10 | 200 K$\Omega$ |
| R11 | 300 $\Omega$ |
| R12 | 1 M$\Omega$ |
| R13 | 330 $\Omega$ |
| R14 | 75 K$\Omega$ |
| R15 | 10 K$\Omega$ |
| R16 | 750 K$\Omega$ |
| R17 | 510 $\Omega$ |
| R18 | 51 K$\Omega$ |
| R20 | 10 K$\Omega$ |
| R21 | 10 K$\Omega$ |
| R22 | 510 $\Omega$ |
| R24 | 51 K$\Omega$ |
| R25 | 10 K$\Omega$ |
| R26 | 1 M$\Omega$ |
| R27 | 1 M$\Omega$ |
| R28 | 10 K$\Omega$ |
| R29 | 10 K$\Omega$ |
| R30 | 10 K$\Omega$ |
| R31 | 51 $\Omega$ |
| R34 | 10 K$\Omega$ |
| U1 | 74HC74 |
| U2 | 74HC123 |
| U3 | LM358 |
| U4 | 74HC00 |
| U5 | 74HC14 |
| U6 | LM555C |
| U7 | LM2574M-50 (manufactured by National Semiconductor Inc.) |

It may be preferable to mount a mechanical amplifier assembly 660 unto sensor 651. This is because piezoelectric sensor 651 typically responds only to high frequency strain caused by bumps or taps. The mechanical amplifier assembly 660 would increase the sensor's sensitivity to low frequencies by converting low frequency, i.e., slow, motions into high frequency taps which can be sensed by sensor 651.

The mechanical amplifier 660 preferably includes a base 661 disposed on the piezoelectric element or wall 32, a shaft 662 extending therefrom, a spring 664 connected at one end to the end of shaft 662, and a mass 663 connected to the other end of spring 664. Preferably, spring 664 is trapped between head 662H and trap 662T of shaft 662. Also, spring 664 may be trapped by mass 663 via screws 663S.

Accordingly, mass 663 is preferably suspended by spring 664. Preferably, shaft 662 extends through mass 663 so that mass 663 is centered along shaft 662. This makes the system sensitive to disturbances in all lateral directions, which would cause mass 663 to tap shaft 662, creating a high frequency tap. In addition, the shaft 662 may limit the motion of mass 663, which prevents over-stretching of spring 664. Mass 663 may also travel vertically along shaft 662 to make the sensor 651 sensitive to vertical motion. Preferably, mass 663 is disposed close to base 661 so that mass 663 can contact base 661 directly.

Referring to FIGS. 1 and 11–13, laser level 10 may be powered by a battery 60. Battery 60 may be connected to laser level 10 via terminals 31T. Frame assembly 30 may have an opening 31F which allows protrusion 61 of battery 60 to enter frame assembly 30 and contact terminals 31T.

Preferably, battery 60 is one that is used with other power tools. Persons skilled in the art are referred to U.S. Pat. Nos. 5,391,972 and 5,144,217, which are wholly incorporated by reference herein.

Preferably, an adapter assembly 70 is used to accept differently-shaped battery packs, especially those that may have the same terminal configuration, but different pack (62) or protrusion (61) shapes. Adapter assembly 70 may include a plate 71, which is preferably made of plastic. Plate 71 may have two opposite curved sides, which have substantially the same radius. Plate 71 may have a flange 71F on each of the curved sides. Flange 71F may be disposed along about 55°–60° of each curved side. Preferably, flange 71F is captured by capture walls 31C in frame assembly 30. Preferably, plate 71 has a pivot boss 71P, which may be captured between two clamshell halves of frame assembly 30, for allowing plate 71 to pivot thereabout.

Plate 71 may have a first opening 72 and a second opening 73, which allow a first battery 60 and a second battery (not shown), respectively, to extend therethrough. Accordingly, if a user wants to insert a first battery, the user would align first opening 72 with opening 31F. Alternatively, if the user wants to insert a second opening, the user would rotate plate 71 to align second opening 73 with opening 31F.

Plate 71 may be provided with detent protrusions 71D, which engage notches (not shown) disposed on frame assembly 30. Detent protrusions 71D may be disposed on tabs 71T, which preferably resiliently bias protrusions 71D towards engagement with the frame assembly notches. Accordingly, the two desired positions of plate 71 can easily be located.

Persons skilled in the art shall recognize that the protrusions and notches may alternatively be disposed on frame assembly 30 and plate 71, respectively. Persons skilled in the art should also recognize that a spring can be used, instead of tabs 71T, to bias protrusions 71D towards the notches.

Plate 71 may also have latch notches 72L, 73L to engage the latches 63 of the first battery 60 and the second battery (not shown), respectively. Preferably, latch notches 72L, 73L are disposed so that they cannot engage the latches 63 of the second battery (not shown) and the first battery 60, respectively.

A battery ejector assembly 74 may be provided to prevent the wrong battery, i.e., the one that cannot engage the proper latch notch, from contacting terminals 31T. Battery ejector assembly 74 may include a button 74B, which is biased by spring 74S towards the battery pack. Preferably, button 74B extends through pivot boss 71B. A clip 71C may trap button 74B within pivot boss 71B. Accordingly, button 74B pushes the wrong battery pack away from pivot plate 71, frame assembly 30 and terminals 31T if the battery pack cannot engage the proper latch notch.

Another aspect of the invention is laser detector 500. Light detectors have been heretofore applied in a variety of fields, which are constituted such that light rays are photoelectrically detected and a measurement result is displayed to measure the intensity of the light, a light-projected location, etc. For example, light detectors have widely been used in a surveying field, which are constructed such that a laser beam is ejected from a surveying instrument body and received at an object to be measured, and the center of the laser beam-projected location is located. In the light detectors of this kind, the light-receiving section for receiving the light and the display section for displaying the measurement results on the basis of a signal from the light-receiving section are ordinarily arranged together in the same plane.

However, since the display section for displaying the measurement result and the light-receiving section are arranged in the same plane in the conventional light detectors thus constituted, a surveying person is required to stand exactly opposed to the display section to accurately read the measurement result. As a result, there occurred an extremely inconvenient problem that the measuring light entering the light-receiving section is interrupted by the surveying person himself.

Persons skilled in the art are hereby referred to U.S. Pat. Nos. 4,934,812 and 5,486,690, which are wholly incorporated herein by reference.

Figure 30:
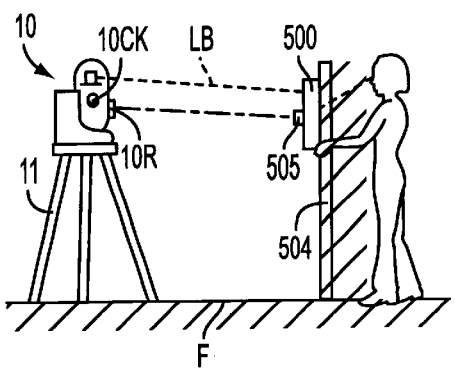
FIG. 30 illustrates a laser level used in conjunction with a light detector.

According to the present invention, the light detector 500 according to the present invention is used, for instance, in combination with a laser level 10. As shown in FIG. 30, the laser level 10 is placed on a tripod 11. As the laser diode assembly 410 rotates around a perpendicular axis thereof, laser beam LB is emitted from the laser diode assembly 410 as a measuring light beam scanned in a horizontal plane.

The light detector 500 which is to receive the laser beam LB emitted from the laser level 10 is adapted to be attached to an appropriate upright face, such as a wall face, or a grade rod 504, held by a user. The light detector 500 may be moved along the rod 504 to detect the height and the location of the center of the laser beam flux with reference to a standard plane F.

Thereby the height and the location of a point or beam to be measured are measured by measuring the height and/or the location of the light detector 500, or a standard horizontal plane in which the laser beam LB is to be scanned is determined by appropriately marking the center of the light flux of the laser beam LB on the grade rod 504.

Figure 36A:
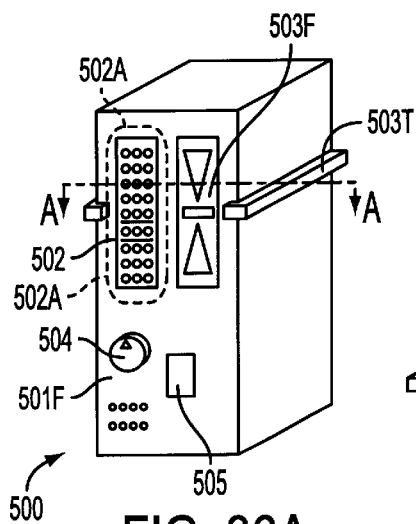
FIG. 36A is a front perspective view thereof.
Figure 36B:
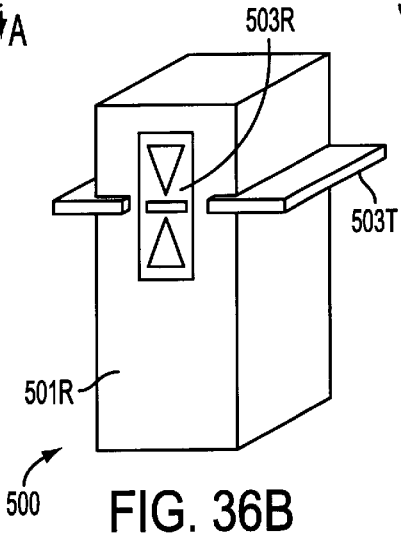
FIG. 36B is a rear perspective view thereof.
Figure 36C:
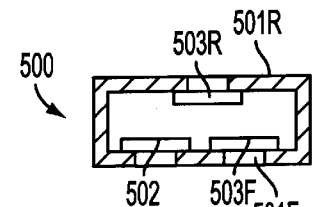
FIG. 36C is a partial cross-sectional view along line A—A of FIG. 36A.

FIGS. 36A–C show the light detector 500 in detail. Light detector 500 may have a front face 501F and a rear face 501R. A light-receiving section 502 may be provided on front face 501F for photoelectrically converting the light beam LB entering therein. Preferably, light-receiving section 502 recognizes changes in intensity, rather than the actual intensity, of the laser beam LB as it sweeps across light-receiving section 502. A light-receiving face of the light-receiving section 502 may be contained in substantially the same plane as the front face 501F.

In addition, display segments 503F, 503R may be respectively formed on front and rear faces 501F, 501R. Preferably, the displaying face of each of the display segments 503F, 503R is substantially coplanar to front and rear faces 501F, 501R, respectively.

The light-receiving section 502 may be constituted by a pair of upper and lower light-receiving segments 502A. A boundary portion between the light-receiving segments 502A, that is, the central position of the light-receiving section 502, is a zone through which a standard horizontal plane of the laser beam LB is to pass.

Light detector may have an operation switch 504 to be actuated when in use.

Figure 31:
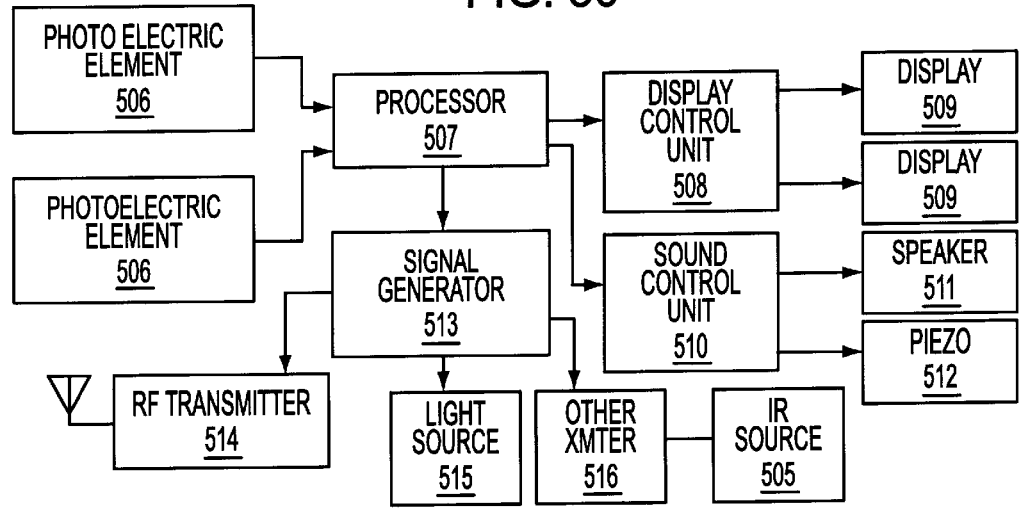
FIG. 31 is a block diagram illustrating the light detector circuit.

FIG. 31 shows a circuit construction of the light detector 500. A pair of photoelectric elements 506 constituting the light-receiving segments 502A may be connected to a processor 507. Processor 507 is adapted to compare the magnitudes of received light amounts of the photoelectric elements 506 and to output a discrimination result thereof. The processor 507 may be connected to a display control unit 508, which is adapted to select a display pattern in compliance with the output from the processor 507. Persons skilled in the art will recognize that display control unit 508 may be integrated into processor 507.

The display control unit 508 may be connected to a display section 509 adapted to display the display pattern responsive to the output from the display control unit 508.

The following constitutes an exemplary use of the light detector 500. While carefully observing an indication of the display section 509, a surveying person moves the light detector 500 along grade rod 504 along a substantially vertical direction, which is substantially perpendicular to the substantially horizontal plane of the laser beam LB. At the same time, the center position of the laser beam LB is determined by the following procedure.

Figure 32A:
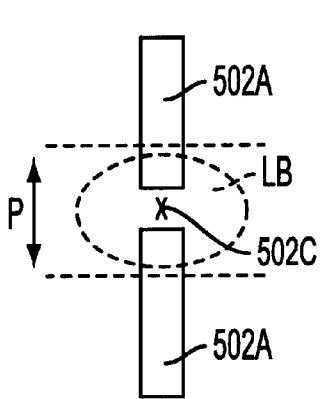
FIGS. 32A–C are diagrammatical plane views illustrating the relation between the measuring light beam and the light-receiving section.
Figure 33A:
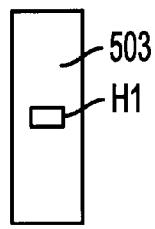
FIGS. 33A–C are plane views illustrating display patterns in the display sections.

As shown in FIG. 32A, when the light flux of the laser beam LB equally enters both the light-receiving segments 502A, that is, when the center of the light flux-passing zone P of the laser beam LB passes through an intermediate point between both the light-receiving segments 502A, i.e., the center point 502C of the light-receiving section 502, a first display pattern H1 may be indicated in the display section 503 (as shown in FIG. 33A) to show that the center of the light flux of the laser beam LB coincides with the center point 502C of the light-receiving section 502 of the light detector 500. Preferably, detector 500 will have notches or tabs 503T disposed thereon to indicate to the user where center point 502C is relative to the light detector 500.

Figure 32B:
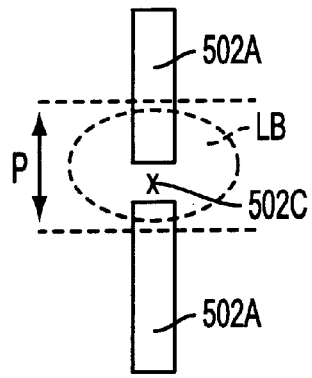
Figure 33B:
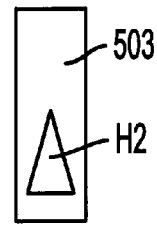

As shown in FIG. 32B, when the light flux-passing zone P of the laser beam LB is deviated into the upper light-receiving segment 502A, a second display pattern H2 may be indicated in the display section 503 (as shown in FIG. 33B) to show that the center of the light flux of the laser beam LB deviates above the center point 502C of the light receiving section 502. Therefore, in this case, the light detector 500 should be moved upwardly.

Figure 32C:
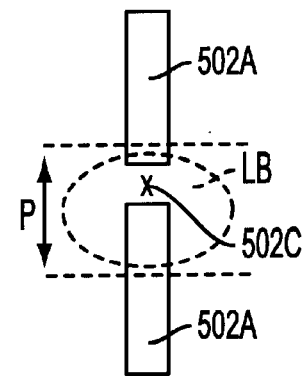
Figure 33C:
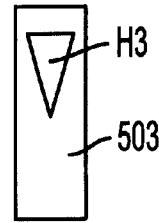
Figure 34:
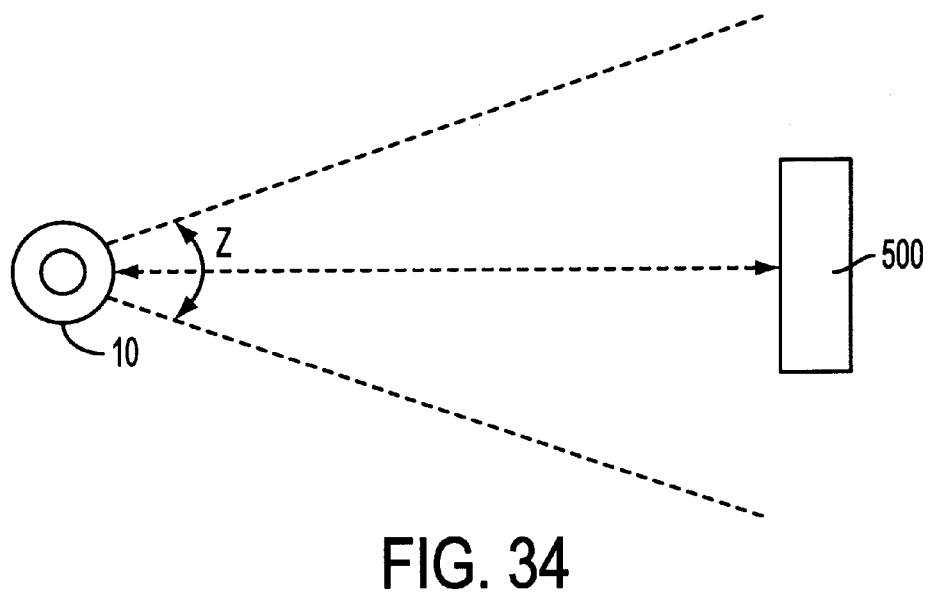
FIG. 34 is a top plan view of the laser level used in conjunction with the light detector.

Further, as shown in FIG. 32C, when the light flux-passing zone P of the laser beam LB deviates into the lower light-receiving segment 502A, a third display pattern H3 may be indicated in the display section 503 (as shown in FIG. 33C) to show that the center of the light flux of the laser beam LB deviates under the center point 502C of the light-receiving section 502 of the light detector 500. Therefore, in this case, the light detector 500 should be moved downwardly.

Persons skilled in the art will recognize that, in each of the above cases, the surveying person M can read the beam incidence results (the display patterns H1, H2, and H3) indicated in the display section 503 on either front face 501F or rear face 501R. Therefore, the measurement could be accurately performed from any direction without fear of the interruption of the measuring light beam as occurred in the conventional detectors. Thus, the present invention largely contributes to the prevention of measuring errors and enhancement of the measuring efficiency.

Referring to FIG. 31, laser detector 500 may have a sound control unit 510 that responds to the output of processor 507. Sound control unit 510 may control a speaker 511 and/or a piezo electric element 512. Persons skilled in the art will recognize that sound control unit 510 may be integrated into processor 507.

Such arrangement provides an aural feedback to the surveying person. For example, processor 507 and/or sound control unit 510 may be programmed so that speaker 511 and/or piezo 512 will sound only when the center of the light flux-passing zone P of the laser beam LB passes through the center point 502C of the light-receiving section 502. In addition, processor 507 and/or sound control unit 510 may be programmed so that speaker 511 and/or piezo 512 will provide a different sound when laser beam LB passes outside center point 502C.

In addition, laser detector 500 may have a signal generator 513 for generating a signal indicating that the laser beam LB has reached detector 500. Persons skilled in the art will recognize that the signal generator 513 may react to the output of processor 507, and/or may be integrated into processor 507.

The signal generated by signal generator 513 may be transmitted via an RF transmitter 514, a light source 515 or any other kind of transmitter 516, including, but not limited to, audio transmitter, microwave transmitter, infrared transmitter, etc. For example, transmitter 516 may have an infrared source 505, which converts the signal to be transmitted into infrared light. The resulting transmission is then sent towards laser level 10, which may be received by receptor 10R.

When laser level 10 receives the transmission, the laser level 10 will oscillate shaft 219 (and laser diode module 415), thus oscillating laser beam LB. Preferably, laser level 10 will oscillate laser beam LB so that it forms an angle Z, which encloses laser detector 500. Angle Z may be between about 1° and about 180°. Accordingly, a user that is only interested in indicating a part of the laser beam plane can now do so by placing a laser detector 500 in the desired portion of the plane.

Preferably, laser level 10 will have a control knob 10CK for controlling the amplitude of angle Z.

Alternatively, laser level 10 could just reverse the rotational direction of shaft 419 when it receives the transmission. Laser detector 500 may have a delay programmed between the time laser beam LB contacts the detector 500 and the time it sends the transmission to laser level 10. This would allow the laser beam LB to move past laser detector 500 before laser level 10 reverses direction. This generates an arc with an angle Z that could be adjusted by changing the delay time or the rotational velocity of the shaft 419.

Laser level 10 could be programmed to ignore every $n^{th}$ transmission, e.g., every third transmission. Accordingly, the laser level 10 would rotate past laser detector 500, reverse its direction and rotate past laser detector 500, and reverse its direction and rotate past laser detector 500 for a third time. Rather than reverse a third time, laser level 10 would continue rotating shaft 419 until it contacts laser detector 500, or a second laser detector. Accordingly, laser level 10 would highlight one laser detector 500, then the other, etc.

Persons skilled in the art may recognize other alternatives to the means disclosed herein. However, all these additions and/or alterations are considered to be equivalents of the present invention.

What is claimed is:

1. A laser level comprising:
   a main housing;
   a laser housing pivotally attached to the main housing, the laser housing being pivotable about 90° relative to the main housing;
   a motor disposed in the laser housing;
   a shaft driven by the motor, the shaft having a longitudinal axis; and
   at least one diode disposed on the shaft for projecting a laser beam, wherein the laser beam is substantially perpendicular to the shaft.

2. The laser level of claim 1, further comprising a locking means for fixing the angular position of the laser housing.

3. A laser level comprising:
   a housing;
   a motor disposed in the housing;
   a shaft driven by the motor, the shaft having a longitudinal axis;
   at least one diode disposed on the shaft for projecting a laser beam, wherein the laser beam is substantially perpendicular to the shaft; and
   a first power tool battery pack electrically connected to the motor and removably attached to the housing.

4. The laser level of claim 3, further comprising a second power tool battery pack electrically connected to the motor and removably attached to the housing.

5. The laser level of claim 4, wherein the first and second battery packs have different voltages.

6. The laser level of claim 4, wherein the first and second battery pack have the same terminal block configuration.

7. A laser level comprising:
   a main housing;
   a motor disposed in the main housing;
   a shaft driven by the motor, the shaft having a longitudinal axis;
   a diode housing disposed on the shaft; and
   at least one diode disposed in the diode housing for projecting a laser beam, wherein the laser beam is substantially perpendicular to the shaft;
   wherein the main housing comprises an upper portion covering the diode housing.

8. The laser level of claim 7, further comprising a plunger disposed on the upper portion of the main housing movable between a first position contacting the diode housing and a second position not contacting the diode housing.

9. The laser level of claim 8, wherein the diode housing can be rotated by rotating the plunger when the plunger is in the first position.

10. The laser level of claim 8, further comprising a spring for biasing the plunger towards the second position.

11. A laser level comprising:

a main housing;

at least one diode disposed in the housing for projecting a laser beam, said beam being rotatable to denote a reference plane; and a protective bar flexibly connected to the main housing.

12. The laser level of claim 11, further comprising a handle attached to the protective bar.

13. The laser level of claim 11, further comprising a connector assembly flexibly connecting the protective bar to the main housing.

14. The laser level of claim 13, wherein the connector assembly comprises a flexible gasket.

15. The laser level of claim 14, wherein the flexible gasket is disposed between the protective bar and the main housing.

16. A laser level comprising:

a main housing;

at least one diode disposed in the housing for projecting a laser beam, said beam being rotatable to denote a reference plane; and a clamp assembly slidably attached to the main housing for clamping the laser level to an architectural feature.

17. A method for constructing a laser level comprising the steps of:

providing a housing, a motor disposed in the housing, a shaft driven by the motor, the shaft having a longitudinal axis, at least one diode disposed on the shaft for projecting an elliptical laser beam with major and minor axes, wherein the laser beam is substantially perpendicular to the shaft; and aligning the at least one diode so that the major axis of the elliptical laser beam is substantially horizontal.

\* \* \* \* \*